(12) United States Patent
Kawamoto et al.

(10) Patent No.: US 8,306,330 B2
(45) Date of Patent: *Nov. 6, 2012

(54) GAME APPARATUS AND STORAGE MEDIUM STORING A HANDWRITING INPUT PROGRAM

(75) Inventors: Koichi Kawamoto, Kyoto (JP); Jun Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/045,081

(22) Filed: Mar. 10, 2011

(65) Prior Publication Data

US 2011/0190053 A1 Aug. 4, 2011

Related U.S. Application Data

(62) Division of application No. 11/526,719, filed on Sep. 26, 2006, now Pat. No. 7,907,779.

(30) Foreign Application Priority Data

Jan. 27, 2006 (JP) ................................ 2006-019205

(51) Int. Cl.
G06K 9/00 (2006.01)
G06K 9/03 (2006.01)
G06F 3/033 (2006.01)
G06F 17/00 (2006.01)

(52) U.S. Cl. ........ 382/187; 382/189; 382/311; 345/179; 715/210

(58) Field of Classification Search .................. 382/187, 382/189, 229, 186, 188, 228, 116, 311, 225, 382/161, 181, 209, 313, 159, 177, 203, 190, 382/195; 715/203, 863, 210, 234; 707/E17.024; 345/173, 179; 706/20; 708/141

See application file for complete search history.

(56) References Cited

U.S. PATENT DOCUMENTS

| 5,050,221 A | 9/1991 | Ohta et al. |
| 5,513,278 A | 4/1996 | Hashizume et al. |
| 6,618,504 B1 | 9/2003 | Yoshino |

(Continued)

FOREIGN PATENT DOCUMENTS

CA  2 414 520  6/2004

(Continued)

OTHER PUBLICATIONS http://www.nikoli.co.jp/puzzles/, 2 pages, 2001-2006.
http://ja.wikipedia.org/wiki/, 5 pages.

*Primary Examiner* — Sheela Chawan
(74) *Attorney, Agent, or Firm* — Nixon & Vanderhye P.C.

(57) ABSTRACT

A method to detect answers and notes inputted a game apparatus including: receiving user input data and determining the received user input data to be an answer character based on a characteristic of the user input data; displaying on the display the answer character contemporaneously with the determination of the received user data is the answer character; making a game determination based on the answer character; displaying a result of the game determination; determining the received user input data to be a note character based on the characteristic of the user input data; displaying the note character contemporaneously with the determination that the user input data is the note character; settling the note character as an answer character based on a user input made after the note character is displayed, and displaying the answer character determined from settling the note character.

31 Claims, 13 Drawing Sheets

| U.S. PATENT DOCUMENTS | | | |
|---|---|---|---|
| 7,146,128 B2 | 12/2006 | Okubo | |
| 7,430,326 B2 | 9/2008 | Moroo et al. | |
| 7,907,779 B2 * | 3/2011 | Kawamoto et al. | 382/187 |
| 2003/0232635 A1 | 12/2003 | Yanagishita | |
| 2004/0141649 A1 | 7/2004 | Landstad et al. | |
| 2005/0084153 A1 | 4/2005 | Khomo | |
| 2006/0160054 A1 | 7/2006 | Onishi et al. | |
| 2006/0214924 A1 | 9/2006 | Kawamoto et al. | |

| FOREIGN PATENT DOCUMENTS | | |
|---|---|---|
| DE | 101 56 579 | 6/2003 |
| JP | 63-155383 | 6/1988 |
| JP | 7-66422 | 7/1995 |
| JP | 07-182099 | 7/1995 |
| JP | 8-27690 | 3/1996 |
| JP | 2004016239 | 1/2004 |

* cited by examiner

FIG. 5
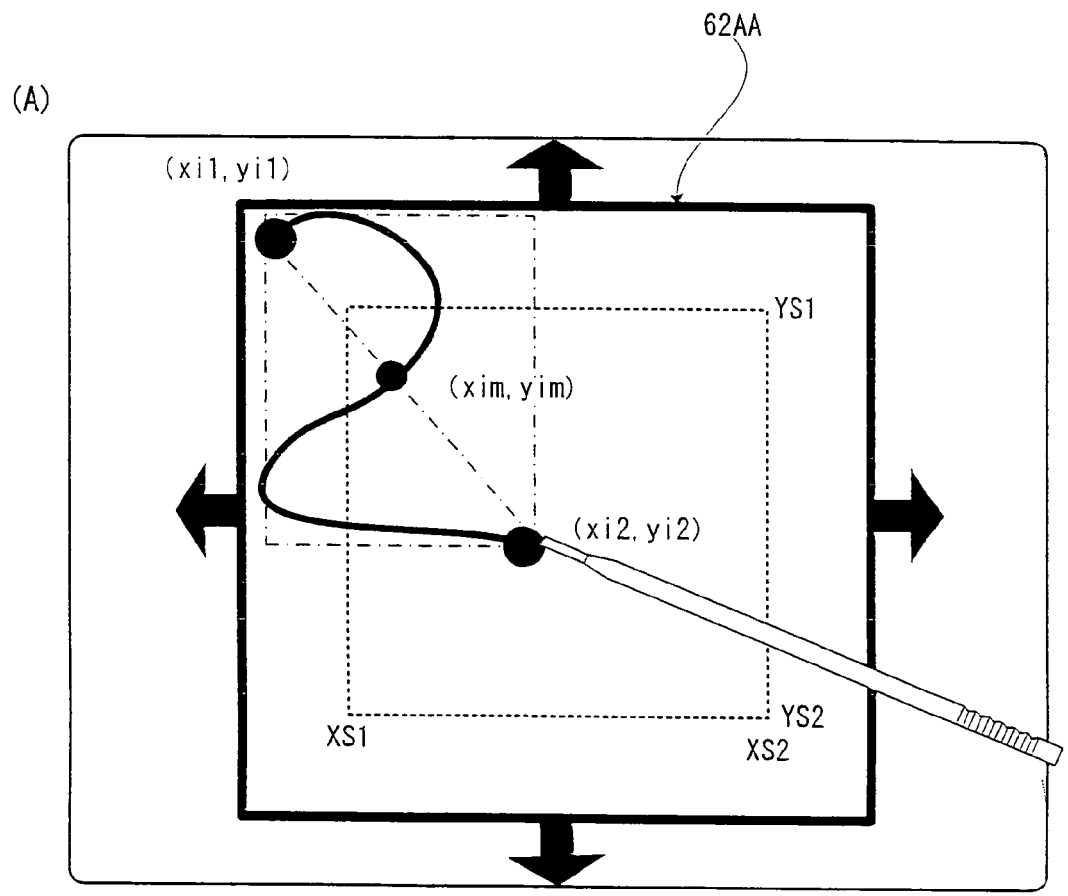
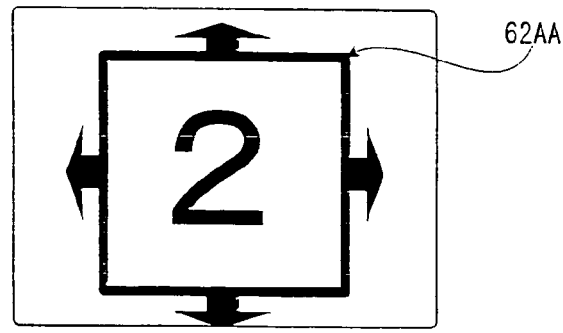

FIG. 6
(A)
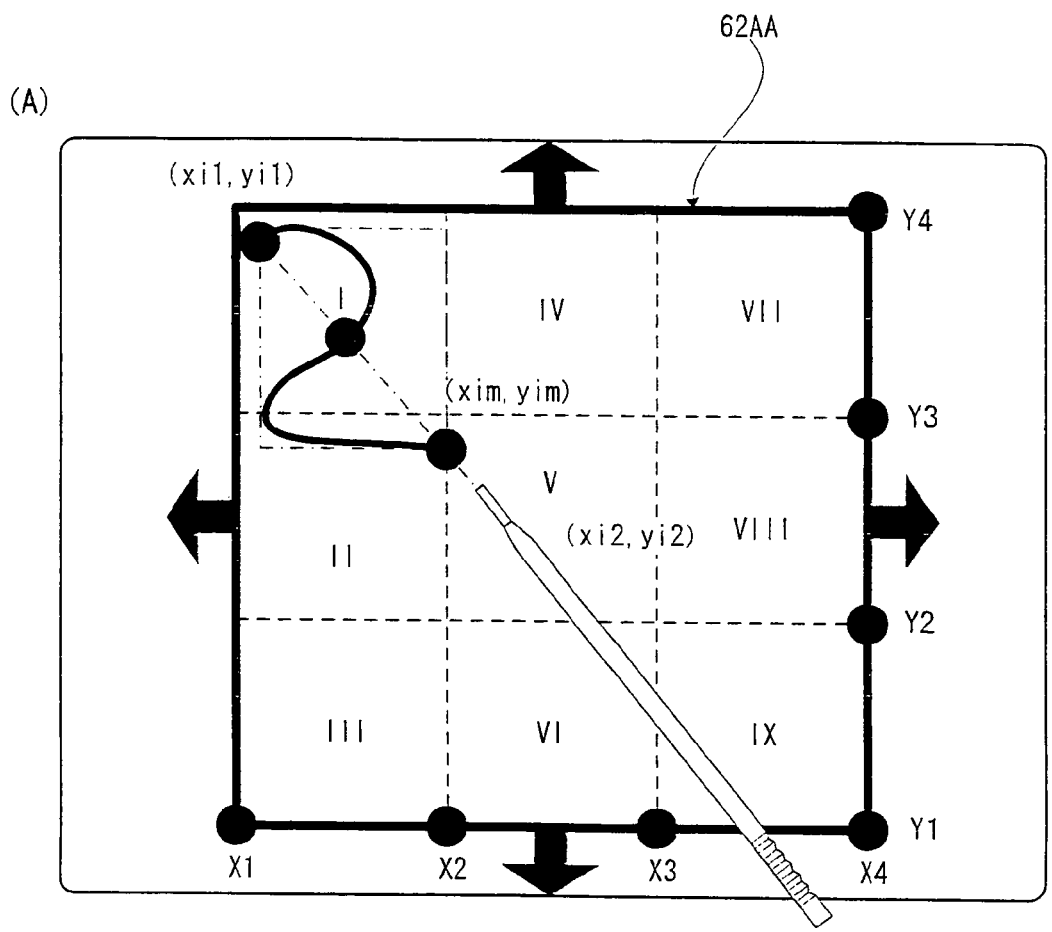
(B)
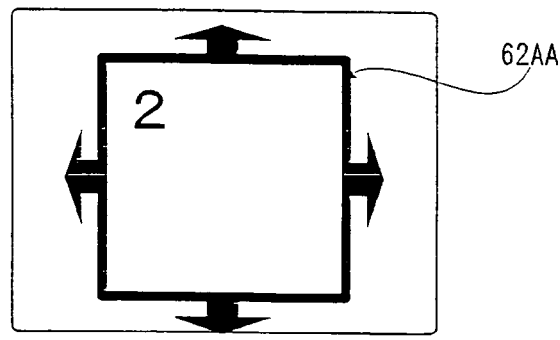

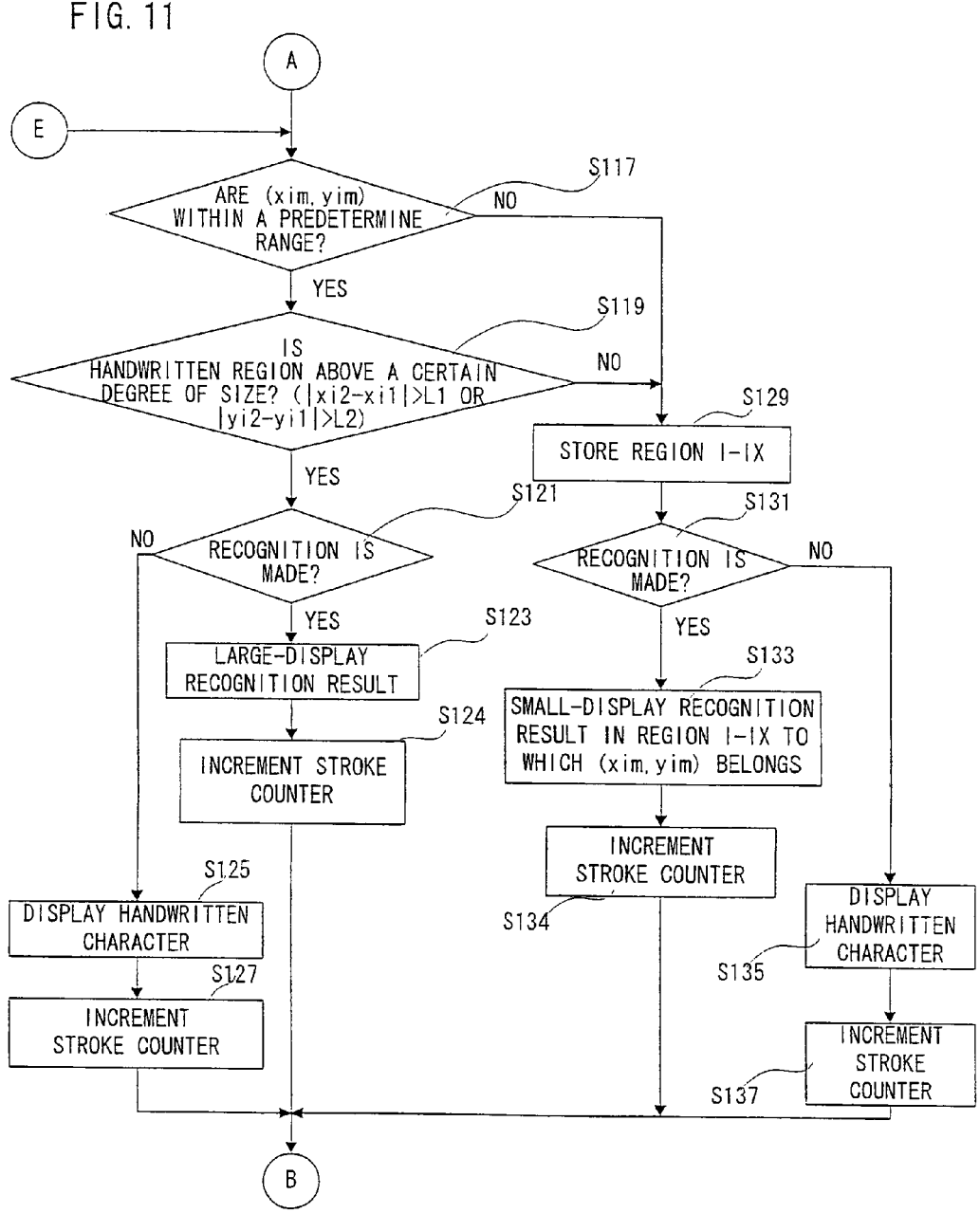

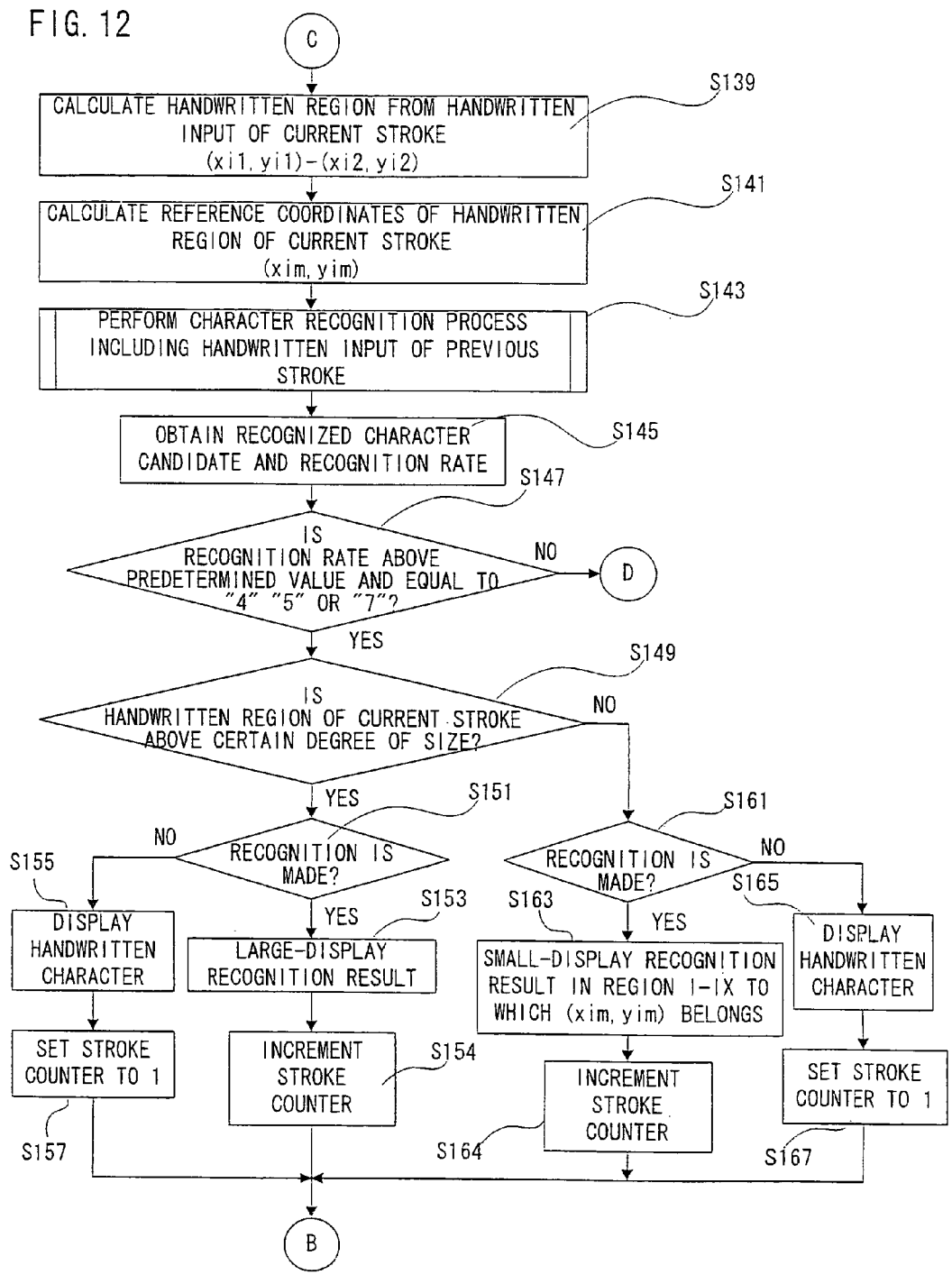

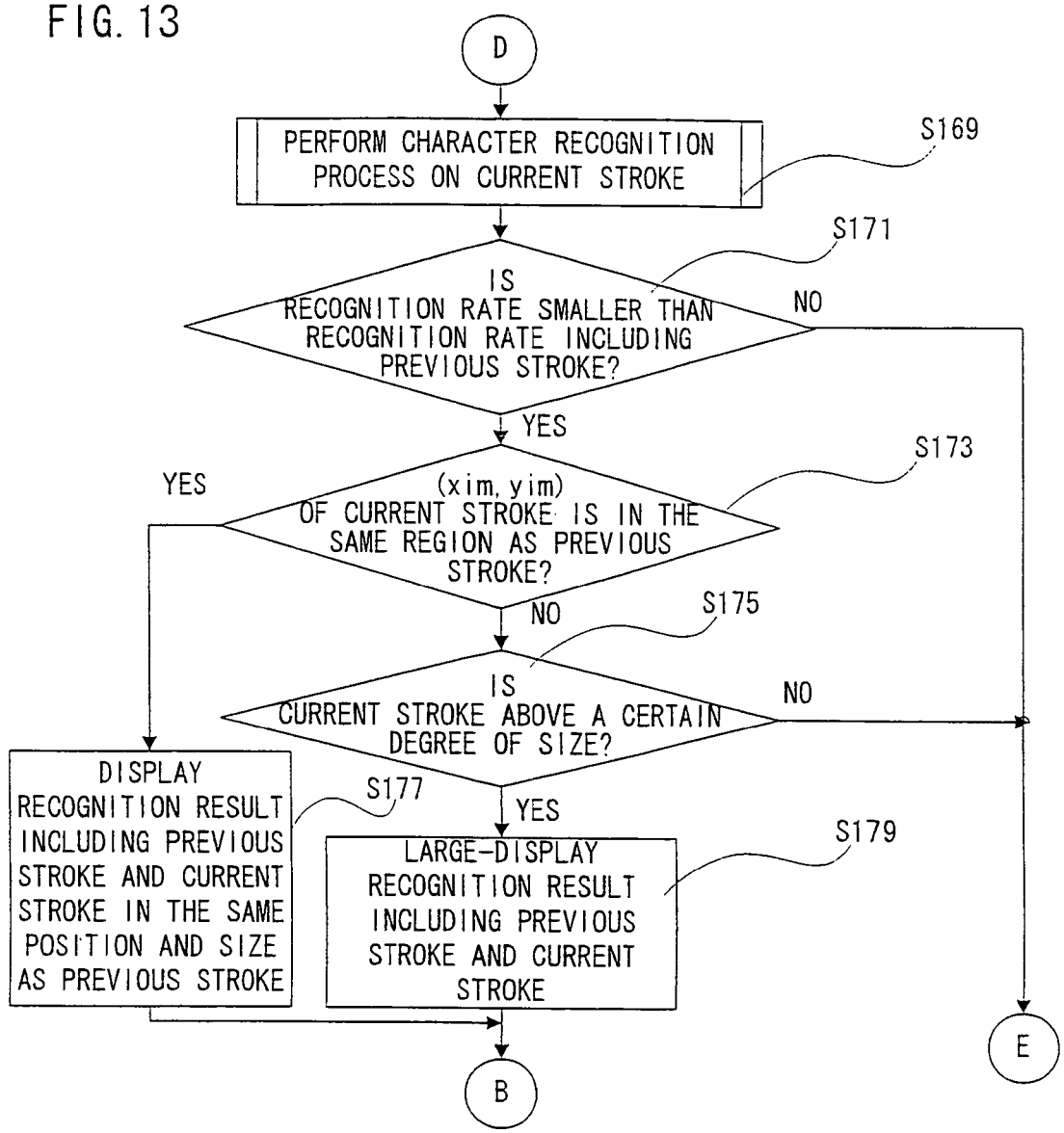

ically, the present invention relates to a game apparatus and a handwriting input program capable of playing a game like a puzzle game to fill in cells with characters, numerals, symbols, or the like such as "Sudoku" (product name) puzzle.

2. Description of the Related Art

The Sudoku puzzle as a background of the invention is disclosed in a related art 1 (http://www.nikoli.co.jp/puzzles/), a related art 2 (http://ja.wikipedia.org/wiki/), etc. for example. According to these, the Sudoku puzzle is one of pencil puzzles to enter numerical digits from 1 through 9 according to a predetermined condition in respective cells of a 9×9 square frame made up of 3×3 blocks, and numerals are entered in advance as a hint in some of the cells, and the goal is to fill in the empty cells from that state.

If such a Sudoku puzzle is played by use of an electronic game machine, such as "Nintendo DS" (trademark), for example or a computer with a touch screen, the answer can directly be handwritten without being recorded in a sheet of paper.

In this case, in the technique described in a related art 3 (Japanese Patent Publication No. 8-27690), for example, when data is to be input into a table, in order to make a handwriting input easier, the input region is displayed in an enlarged manner at a time of input.

Also, in the technique described in a related art 4 (Japanese Patent Publication No. 7-66422), depending on in which region the handwriting input is made, the recognition result is large-displayed or small-displayed.

However, as typified by the related art 3, if one recognition result is displayed with respect to one handwriting input region in one displaying manner, in a case that a player wants to note a plurality of candidates to be input in advance in the puzzles represented by Sudoku, etc., the player has to write the candidates in other media until an input is settled as the final input. Accordingly, unnecessity of paper in utilizing the handwriting input device, that is, customer convenience is lost.

In addition, in the technique described in the related art 4, when a plurality of recognition results are to be displayed by smaller characters, for example, the player has to input by handwriting in the corresponding smaller regions. Accordingly, unless the region of the handwriting input is above a certain degree of size, it is difficult to introduce the technique.

SUMMARY OF THE INVENTION

Therefore, a novel game apparatus is disclosed capable of playing a game to fill in cells with characters.

The disclosed game apparatus is capable of inputting a note character as well as an answer character, and displaying them so as to be visible by a player.

The disclosed game apparatus is capable of automatically discriminating between an answer character and a note character without forcing a player to substantially change a handwriting input method when the answer character and the note character are input by handwriting with the use of a touch panel or a touch screen.

A novel storage medium is disclosed storing a handwriting input program.

A first disclosed embodiment comprises a "game apparatus for playing a game to fill in cells with characters, and comprises an answer character input means for inputting an answer character, an answer character display means for displaying the answer character when the answer character is input by the answer character input means, a game determination means for performing a game determination on the basis of the answer character, a result display means for displaying a result of the game determination by the game determination means, a note character input means for inputting a note character, a note character display means for displaying the note character input by the note character input means, and a settling means for settling the note character as the answer character.

The first disclosed embodiment comprises a game apparatus (10: a reference numeral corresponding in the "preferred embodiments" described later and so forth) for playing a game to fill in cells with characters, such as a puzzle game. Such a game apparatus includes an answer character input means for inputting an answer character, and in the embodiment, this means includes a touch panel (24) and a CPU core (34) for processing a signal or data output therefrom, and allows the answer character to be input by handwriting, for example.

Then, when the answer character is input by the answer character input means, an answer character display means (14, 34, S123, S153, S179) entire-displays or large-displays the answer character in a cell, for example. A game determination means capable of including the CPU core (34), for example, performs a game determination on the basis of the answer character (S25). Similarly, a result display means like a CPU core displays a result of the game determination by the game determination means (S27). Also, a note character input means (24, 34) inputs a note character. A note character display means (14, 34, S133, S163, S177) displays the note character input by the note character input means. More specifically, in this embodiment, the note character is displayed in a smaller area in the cell. However, if a settling means (34, S19) settles an arbitrary note character as the answer character, the above-described game determination means performs a game determination according to the answer character.

According to the first disclosed embodiment, the note character as well as the answer character can be input and displayed, and this eliminates the need for a troublesome operation of noting a candidate to be filled in the cell in other media, such as paper, or the like.

In the game apparatus according to the first disclosed embodiment, the note character input means may input a plurality of note characters, and the note character display means simultaneously displays the plurality of note characters.

When the note character input means (24, 34) inputs a plurality of note characters, the note character display means (14, 34, S133, S163, S177) simultaneously displays the plurality of note characters. For example, nine (9) note characters can be input at maximum, and the note characters are displayed in smaller regions, and therefore, it is possible to display different note characters in a plurality of different regions. Accordingly, it is possible to select an answer character that is probable among the plurality of note characters.

The answer character input means and the note character input means include a handwriting input means having a defined handwriting region, a locus storing means for storing a locus of a handwritten input by the handwriting input means, a character recognition means for recognizing a handwritten character according to the locus, and a size determination means for determining whether a size of the handwritten character at that time is larger than a predetermined size on the basis of the locus, wherein the answer character input means, according to an affirmative determination of the size determination means, and the note character input means, according to a negative determination of the size determination means, adopt the character recognized by the character recognition means as the answer character and the note character, respectively.

The answer character input means and the note character input means are, optionally, formed by the same thing. That is, it includes a handwriting input means (24) having a defined handwriting region, a locus storing means (42, 42b1, S103) for storing a locus or track of the handwritten input by the handwriting input means, a character recognition means (S109, S143, S169) for recognizing the handwritten character according to the locus or track, and a size determination means (S119, S149, S175) for determining whether a size of the handwriting character is larger than a predetermined size. When the size determination means makes an affirmative determination, that is, a handwritten region is above a certain degree of size, the answer character input means, according to the determination, and the note character input means, according to the negative determination by the size determination means adopt the character recognized by the character recognition means as an answer character or a note character, respectively (S123, S133, S153, S163, S179, S177).

The answer character input means and the note character input means may comprise the same handwriting input system, and the answer character and the note character can be naturally input by being discriminated from each other without a drastically change of an operating method, eliminating imposition of an extra load and troublesomeness on the player.

The locus storing means may store a locus for each stroke, and further may comprise a stroke counter for counting the number of strokes, wherein the character recognition means recognizes a handwritten character on the basis of both of loci of a previous stroke and a current stroke when a count value of the stroke counter is not a predetermined value.

A stroke counter (42b4) may be provided within a RAM (42), for example, and the stroke counter counts the number of strokes. The character recognition means recognizes a handwritten character on the basis of both of loci of a previous stroke and a current stroke when the count value of the stroke counter is not a predetermined value ("0", for example) (S143). Thus, the character basically made up of two strokes can be input by handwriting like he or she usually writes it on paper without a specific awareness.

The note character display means may display the note character at a handwriting position of the previous stroke when the size determination means makes a negative determination as to the handwritten character of the current stroke.

When a handwritten region of the second stroke is not above a certain degree of size, it may be determined to be an input of the note character, and the character input by two strokes may be displayed as a note character. At this time, the note character is displayed in the area to which the previous stroke belongs.

Optionally, the character recognition means recognizes the handwritten character on the basis of the current stroke when the count value of the stroke counter is the predetermined value.

Optionally, the character recognition means recognizes the handwritten character on the basis of the locus of the current stroke (S109) when the count value of the stroke counter is the predetermined value ("0", for example), and therefore, even the character typically made up of one stroke can be input by handwriting like he or she usually writes it on paper.

The handwriting input program for working a handwriting input device may include a display means, a storage means, and a handwriting input means as a handwriting input device, and a handwriting input program for causing a computer of the handwriting input device to execute a handwriting inputting step for storing a locus of a handwritten input in the storage means, a locus region specifying step for specifying a region occupied by the locus in a the handwriting input region set in advance in the storage means on the basis of the locus of the handwritten input, and storing it in the storage means, a character recognizing step for performing a character recognition process on the locus of the handwritten input stored in the storage means, and a recognition result displaying step for displaying the recognition result in a size corresponding to the size of the region specified by the locus region specifying step and in a position corresponding to the region on the display means.

The handwriting input device may be embodied as a game apparatus (10) in the embodiment, and has a display means (14), a storage means (42), and a handwriting input means (24). The handwriting input program causes a computer of the handwriting input device to execute a handwriting inputting step (S103) for storing a locus of a handwritten input in the storage means, a locus region specifying step (S113) for specifying a region occupied by the locus in the handwriting input region set in advance in the storage means on the basis of the locus of the handwritten input, and storing it in the storage means, a character recognizing step (S109, S143, S169) for performing a character recognition process on the locus of the handwritten input stored in the storage means, and a recognition result displaying step (S123, S153, S179, S133, S163, S177) for displaying the recognition result in a size corresponding to the size of the region specified by the locus region specifying step and in a position corresponding to the region on the display means.

On the basis of the data indicating that how much the input locus occupies the handwriting input region and where the weight of the locus is placed, and whether the recognition result is displayed in a smaller size or a larger size is automatically selected and displayed, and therefore, it is possible to provide a handwriting input program capable of inputting the note without drastically changing a handwriting input method according to the handwriting input desired by the player's intuitive sense.

In an embodiment of the handwriting input program, which the recognition result displaying step further includes a character display size determining step for determining a display size of the recognition result in correspondence to the size of the region specified by the locus region specifying step, and a character display position determining step for determining a display position of the character recognition result in correspondence to the position of the region specified by the locus region specifying step.

The size of the handwriting input region may be determined depending on the position of the midpoint of the region, for example, it is possible to automatically select a display manner without performing a complicated process.

In the handwriting input program the character display size determining step may determine the display size depending on whether or not a central point of the region specified by the locus region specifying step is included in a predetermined region of the handwriting input region stored in the storage means in advance, and whether or not the region has a predetermined size.

A region to be small-displayed is determined in advance, and the small-display region is decided according to the relation between the region and the central point of the region, capable of automatically selecting the display manner with a simpler process. Also, the display manner is automatically selected according to the midpoint of the region, eliminating the need of inputting by handwriting in a smaller size desired to be displayed when the player wants to display in a smaller size, for example.

In the handwriting input, the display position determining step may determine that the central point of the region corresponds to which of the plurality of display positions of the recognition result stored in the storage means in advance, and displays the recognition result in the corresponding display position.

A handwriting program capable of precisely realizing a process of setting the size and position of the character display with respect to the character made up of a plurality of strokes is disclosed herein. Furthermore, it is possible to simply and intuitively designate the display position of the note character.

A note character as well as the answer character can be input and displayed, and this eliminates the need for a troublesome operation of noting a candidate to be filled in the cell in other media, such as paper.

The above described exemplary objects and other objects, features, aspects and advantages of the disclosed embodiments of the present invention will become more apparent from the following detailed description of the present invention when taken in conjunction with the accompanying drawings.

BRIEF DESCRIPTION OF THE DRAWINGS

FIG. 5 is an illustrative view showing one example of a case that a recognition result of a handwritten input is large-displayed (displayed as a settled answer).

FIG. 6 is an illustrative view showing one example of a case that a recognition result of a handwritten input is small-displayed (displayed as a note).

FIG. 11 is a flowchart showing an operation of the handwriting input process continued from FIG. 10.

FIG. 12 is a flowchart showing the handwriting input process continued from FIG. 11.

FIG. 13 is a flowchart showing the handwriting input process continued from FIG. 12.

DETAILED DESCRIPTION OF THE PREFERRED EMBODIMENTS

Figure 1:
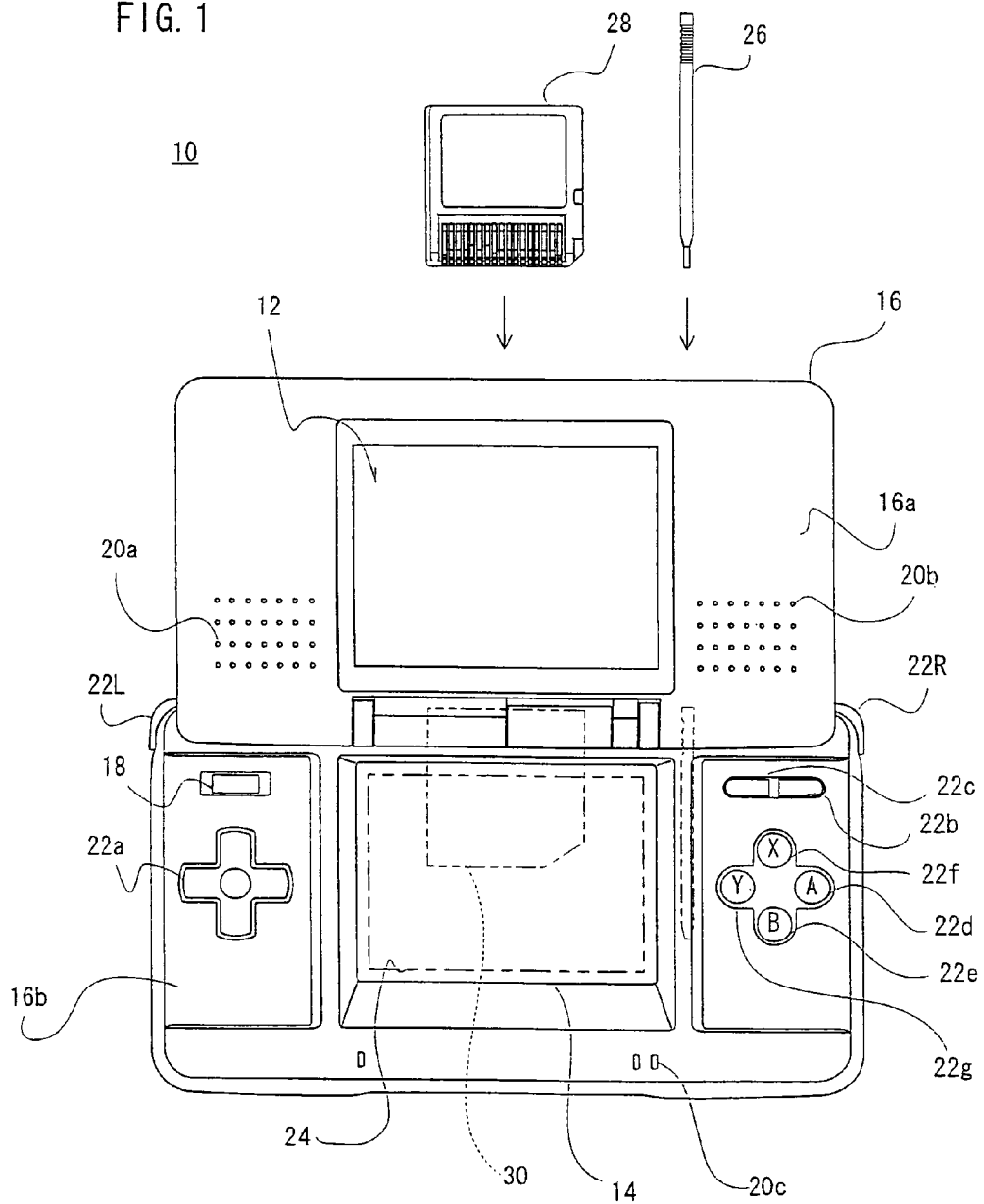
FIG. 1 is an illustrative view showing one embodiment of a game apparatus of this invention.

Referring to FIG. 1, a game apparatus 10 of an embodiment of this invention also works as an information processing apparatus. The game apparatus 10 includes a first liquid crystal display (LCD) 12 and a second LCD 14. The LCD 12 and the LCD 14 are provided on a housing 16 so as to be arranged in a predetermined position in the housing. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although the LCD is utilized as a display in this embodiment, an EL (Electronic Luminescence) display and a plasma display may be used in place of the LCD.

As can be understood from FIG. 1, the upper housing 16a has a plane shape slightly larger than a plane shape of the LCD 12, and has an opening formed so as to expose a display surface of the LCD 12 from one main surface thereof. On the other hand, a plane shape of the lower housing 16b is oblonger than the upper housing 16a, and has an opening formed so as to expose a display surface of the LCD 14 at an approximately center of the horizontal direction. At the left of the LCD 14 on the lower housing 16b is provided a power switch 18.

Also, on the upper housing 16a, sound release holes 20a and 20b for speakers 36a and 36b (FIG. 2) are provided, sandwiching the LCD 12 side by side. Then, on the lower housing 16b, a microphone hole 20c for a microphone (not illustrated) is provided, and the operating switch 22 (22a, 22b, 22c, 22d, 22e, 22L and 22R) is provided.

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. However, the upper housing 16a and the lower housing 16b are not necessarily rotatably connected with each other, and may alternatively be provided integrally (fixedly) to form the housing 16.

The operating switch 22 includes a direction designating switch (cross switch) 22a, a start switch 22b, a select switch 22c, an action switch (A button) 22d, an action switch (B button) 22e, an action switch (L button) 22L, and an action switch (R button) 22R. The switches 22a are placed at the left of the LCD 14 on the one main surface of the lower housing 16b. The other switches 22b-22g are placed at the right of the LCD 14 on the one main surface of the lower housing 16b. Furthermore, the switches 22L and 22R are placed at the left and right corners on the upper surface of the lower housing 16b sandwiching the connected portion with the upper housing 16a.

The direction designating switch 22a functions as a digital joystick, and is utilized for instructing or designating a moving direction of a player character (or player object) to be operated by a player and instructing or designating a moving direction of a cursor, and so forth by operating any one of four depression portions. The start switch 22b is formed by a push button, and is utilized for starting (restarting), temporarily stopping (pausing) a game, and so forth. The select switch 22c is formed by the push button, and utilized for a game mode selection, etc.

The action switch 20d, that is, the A button is formed by a push button, and allows the player character to perform an arbitrary action, except for instructing the direction, such as hitting (punching), throwing, holding (acquiring), riding, jumping, etc. For example, in an action game, it is possible to apply an instruction of jumping, punching, moving weapon, etc. In a role-playing game (RPG) and a simulation RPG, it is possible to apply an instruction of obtaining an item, selecting and determining weapon or command, etc. The action switch 22e, that is, the B button is formed by a push button, and is utilized for changing a game mode selected by the select switch 22c, canceling an action determined by the A button 22d, and so forth.

The action switch 22L (left depression button) and the action switch 22R (right depression button) are formed by push buttons, and the left depression button (L button) 22L and the right depression button (R button) 22R are utilized for performing the same operation as the A button 22d and the B button 22e, and are also utilized for a subsidiary operation of the A button 22d and the B button 22e.

In addition, on a top surface of the LCD 14, a touch panel 24 is provided. As the touch panel 24, any one of kinds of a resistance film system, an optical system (infrared ray system) and an electrostatic capacitive coupling system, for example, can be utilized. In response to an operation by depressing, stroking, touching, and so forth (hereinafter, simply referred to as "depressing") with a stick 26, a pen (stylus pen), or a finger (hereinafter, referred to as "stick or the like 26") on a top surface of the touch panel 24, the touch panel 24 detects coordinates of the operated position by the stick or the like 26 to output coordinates data corresponding to the detected coordinates.

In addition, in this embodiment, a resolution of the display surface of the LCD 14 is 256 dots×192 dots, and a detection accuracy of the touch panel 24 is also rendered as 256 dots× 192 dots in correspondence to the resolution of the display surface (this is true for the LCD 12). However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD (LCD 12 in this embodiment), and a game screen (operation screen) including diagram information, an icon, etc. for operating the game may be displayed on the other LCD (LCD 14 in this embodiment). Furthermore, by utilizing the two LCD 12 and LCD 14 as one screen, it is possible to display a large monster (enemy character) to be defeated by the player character.

Accordingly, the player is able to point a character image such as a player character, an enemy character, an item character, diagram information, an icon, etc. to be displayed on the screen of the LCD 14 and select commands by operating the touch panel 24 with the use of the stick or the like 26. Furthermore, it is possible to change the direction of a virtual camera (viewpoint) provided in the three-dimensional game space, and it is possible to instruct the scrolling (gradually moving display) direction of the game screen (map).

In addition, depending on the kind of the game, the LCD 14 can be used for other various input instructions, such as selecting or operating the icon displayed on the LCD 14, instructing a coordinate input, handwriting input of characters, numerals, and symbols, and so forth.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

Furthermore, in this embodiment, the stick or the like 26 can be inserted into a housing portion (shown by dotted lines in FIG. 1) provided on the lower housing 16b, for example, and taken out therefrom as necessary. However, in a case of preparing no stick 26, it is not necessary to provide the housing portion.

Also, the game apparatus 10 includes a memory card (or cartridge) 28. The memory card 28 is detachable, and inserted into a loading slot 30 (shown by dotted lines in FIG. 1) provided on a rear surface or a lower edge (bottom surface) of the lower housing 16b. Although omitted in FIG. 1, a connector 32 (see FIG. 2) is provided at a back portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

Although not illustrated in FIG. 1, the speakers 36a and 36b (see FIG. 2) are provided at positions corresponding to the sound release holes 20a and 20b inside the upper housing 16a.

Furthermore, although omitted in FIG. 1, a battery accommodating box is provided on a rear surface of the lower housing 16b, for example, and a volume switch, an external expansion connector, an earphone jack, etc. are provided on a bottom surface of the lower housing 16b.

Figure 2:
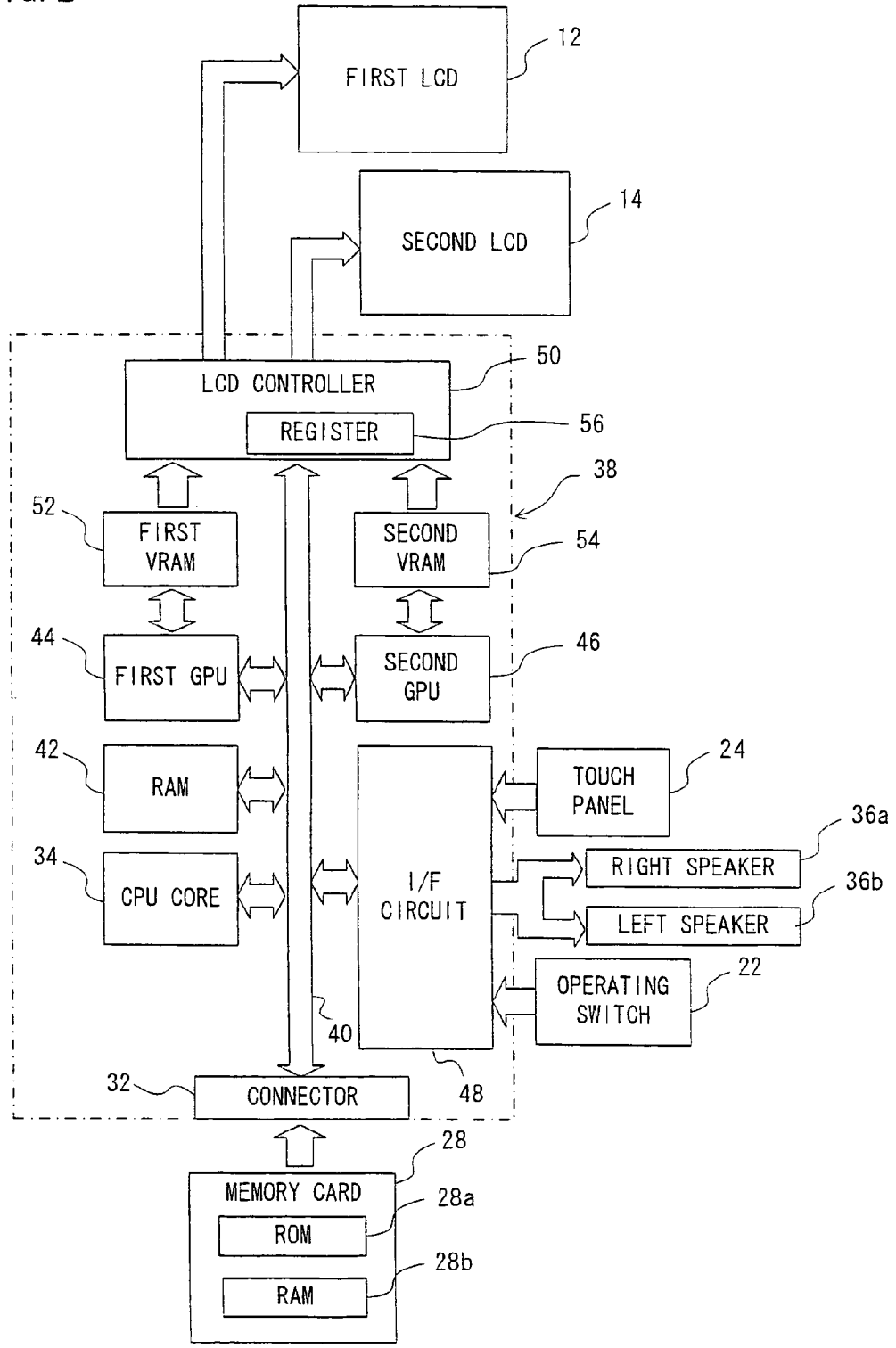
FIG. 2 is a block diagram showing an electric configuration of the game apparatus of the embodiment shown in FIG. 1.

FIG. 2 is a block diagram showing an electrical configuration of the game apparatus 10. Referring to FIG. 2, the game apparatus 10 includes an electronic circuit board 38, and on the electronic circuit board 38, circuit components such as a CPU core 34, etc. are mounted. The CPU core 34 is connected to the connector 32 via a bus 40, and is connected with a RAM 42, a first graphics processing unit (GPU) 44, a second GPU 46, and an input-output interface circuit (hereinafter, referred to as "I/F circuit") 48, an LCD controller 50.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 32. Accordingly, the CPU core 34 can access to the ROM 28a and the RAM 28b as described above.

The ROM 28a stores in advance programs such as a game program for a game to be executed by the game apparatus 10, a handwritten character processing program, a character recognition program, and in addition thereto, image data (text and character image, background image, item image, icon (button) image, message image, etc.), data of the sound (music) necessary for the game (sound data), etc. The RAM (backup RAM) 28b stores (saves) a character recognition result as well as proceeding data and result data of the game.

In addition, the game apparatus 10 can play a game content decided by the memory card 28, but also can be utilized besides game playing. For example, it can work as an information processing apparatus in which a keyboard or a key figure is displayed on the second LCD 14, and by performing a touch input (operation) on the touch panel 24 to specify the key figure, characters, numerals, symbols, etc. (hereinafter, referred to as "character" as a whole) designated by the keyboard or the key figure can be input. In this case, a program for an information processing is stored in the ROM 28a in place of the game program.

In addition, in a case of utilizing the game apparatus 10 as the above-described information processing apparatus, the image to be displayed is naturally not a game image, but images of the above-described keyboard or key figure, a figure of the input character, etc.

The RAM 42 is utilized as a buffer memory or a working memory. That is, the CPU core 34 loads the program, the image data, the sound data, etc. stored in the ROM 28a of the memory card 28 into the RAM 42, and executes the loaded program. The CPU core 34 executes a game process while storing data (game data, flag data, etc.) temporarily generated in correspondence with a progress of the game in the RAM 42.

In addition, the game program, the image data, the sound data, etc. are read from the ROM 28a entirely at a time, or partially and sequentially as necessary so as to be stored (loaded) into the RAM 42.

However, a program as to an application except for the game and image data required to execute the application may be stored in the ROM 28a of the memory card 28. In addition, sound (music) data may be stored therein as necessary. In such a case, in the game apparatus 10, the application is executed.

Each of the GPU 44 and the GPU 46 forms a part of a rendering means, is constructed by, for example, a single chip ASIC, and receives a graphics command (construction command) from the CPU core 34 to generate image data according to the graphics command. The CPU core 34 applies an image generation program (included in the game program) required to generate the image data to both of the GPU 44 and GPU 46.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: character data, texture data, etc.) necessary for executing the graphics command. The CPU core 34 writes image data necessary for rendering to the first VRAM 52 and the second VRAM 54 via the GPU 44 and the GPU 46. The GPU 44 accesses the VRAM 52 to generate image data for rendering, and the GPU 46 accesses the VRAM 54 to produce image data for rendering.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data created by the GPU 44 to the LCD 12, and outputs the image data created by the GPU 46 to the LCD 14 in a case that the data value of the register 56 is "0". On the other hand, the LCD controller 50 outputs the image data created by the GPU 44 to the LCD 14, and outputs the image data created by the GPU 46 to the LCD 12 in a case that the data value of the register 56 is "1".

In addition, the LCD controller 50 can directly read the image data from the VRAM 52 and the VRAM 54, or read the image data from the VRAM 52 and the VRAM 54 via the GPU 44 and the GPU 46.

The I/F circuit 48 is connected with the operating switch 22, the touch panel 24 and the speakers 36a and 36b. Here, the operating switch 22 is the above-described switches 22a, 22b, 22c, 22d, 22e, 22L and 22R, and in response to an operation of the operating switch 22, a corresponding operation signal (operation data) is input to the CPU core 34 via the I/F circuit 48. Furthermore, coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36a, 36b via the I/F circuit 48.

Prior to a detailed description of the embodiment, a description on a number placement puzzle playable in the embodiment will be made within a necessary range. The number placement puzzle has been well known under the designation of "Sudoku", and is one of pencil puzzles to enter a numerical digit from 1 through 9 in each cell of a 9×9 square frame made up of 3×3 blocks (http://www.nikoli.co.jp/puzzles/or http://ja.wikipedia.org/wiki/, for example).

In addition, numerals have been entered in advance in some cells of 9×9 (=81) as a hint, and the goal is to fill in the empty cells from the state according to some rules below.

(1) Each of the cells in the same row, including a cell to which a numeral has been already given as a question, does not contain the same numerals, that is, contains the numerals 1-9 exactly once.

(2) Each of the cells in the same column, including a cell to which a numeral has already been given as a question, does not contain the same numerals, that is, contains the numerals 1-9 exactly once.

(3) Each of the cells of 3×3 subblocks enclosed by bold line, including a cell to which a numeral has already been given as a question, does not contain the same numerals, that is, contains the numerals 1-9 exactly once.

(4) When the total number of cells is 25×25, the numerals 1-25 are utilized, and the subblocks is 5×5. Similarly, when the total number of cells is 16×16, the numerals 1-16 are utilized, and the subblocks is 4×4. The same idea is applied to any number of cells.

Figure 3:
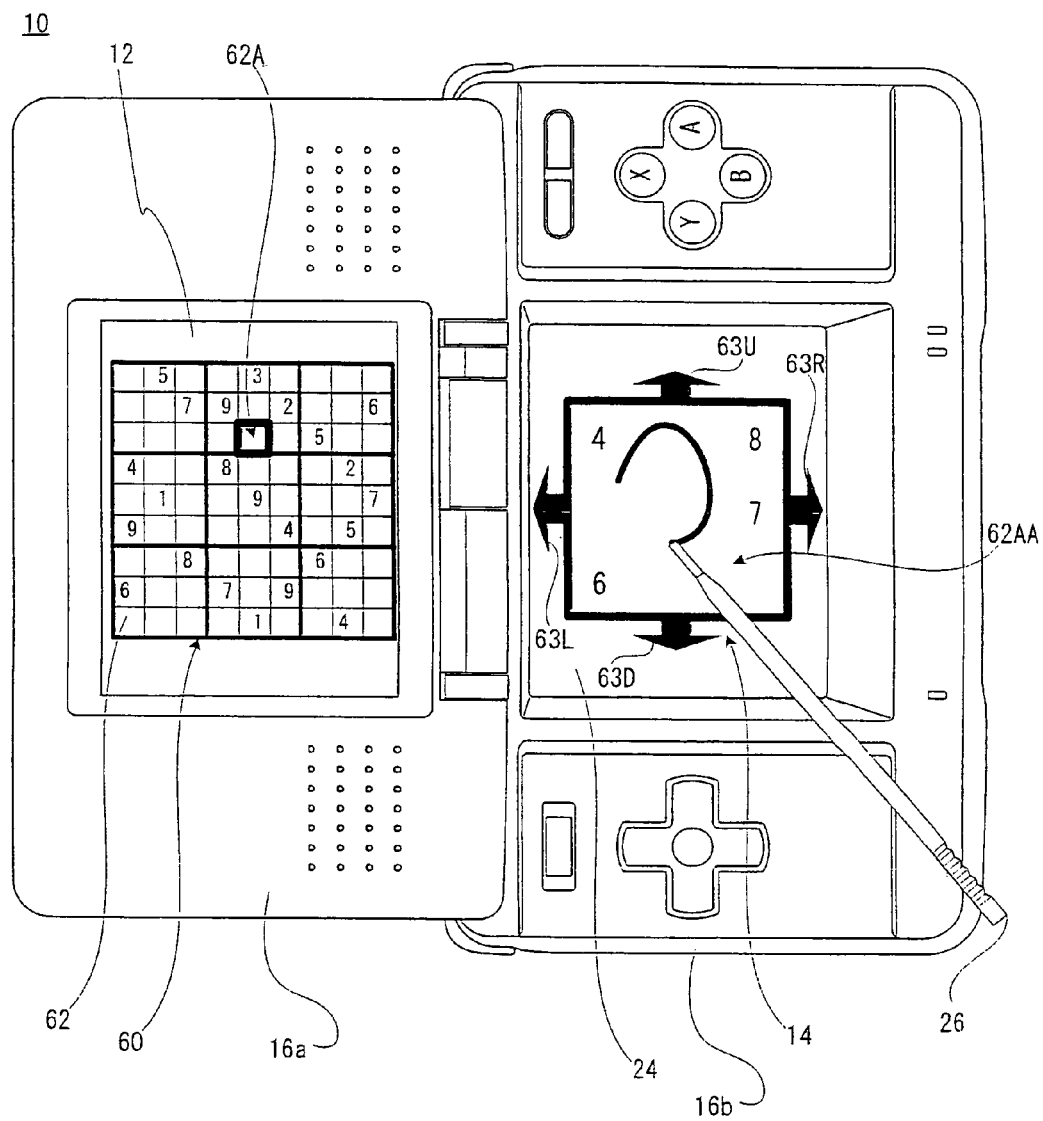
FIG. 3 is an illustrative view showing a state in which "Sudoku" as one example of games is played with the game apparatus shown in FIG. 1.

FIG. 3 mainly shows how to use each part of the game apparatus 10 shown in FIG. 1 and FIG. 2 when the Sudoku game or the number placement puzzle game with 3×3 subblocks is played by utilizing it. The game apparatus 10 has the first LCD 12 and the second LCD 14 provided on the opposite surfaces of the foldable housings 16a and 16b as described above, and the second LCD 14 has the touch panel 24 operable by the stick or the like 26. Then, when the Sudoku game is played, the game apparatus 10 is used in a rotated manner such that the first LCD 12 is left and the second LCD 14 is right as a simple one embodiment. However, such usage is arbitrary, in which the first LCD 12 is above and the second LCD 14 is below as shown in FIG. 1, and the first LCD 12 is right and the second LCD 14 is left in reverse to FIG. 3.

In the above-described state, a game screen 60 is displayed on the first LCD 12, including cells of a 9×9 grid in which numerals as a question (hint) are displayed or inserted in advance in a plurality of cells adequately decided. The game screen 60 has 81 cells 62 in total, and the cell denoted by the reference numeral 62A is the cell to which a player currently gives an answer. The cell to which a player currently gives an answer 62A is picked up by one, and enlarged so as to be displayed as a cell 62AA on the second LCD 14. More specifically, the game screen 60 is first displayed on the second LCD 14, for example, and in that state, the player selects any of the answer cell 62A, and then touches a zoom-out button (not illustrated) displayed on the touch panel 24 (LCD 14), the state in FIG. 3 prevails in which the enlarged cell 62AA is displayed on the second LCD 14, and the game screen 60 is displayed on the first LCD 12.

The touch panel 24 is set on the second LCD 14, and therefore, the game player inputs by handwriting a note numeral and/or an answer numeral in the cell 62AA on the touch panel 24 with the use of the stick or the like 26 to thereby give an answer to the cell 62AA in question. In this embodiment, inputting by handwriting the note numeral as well as the answer numeral in the cell 62AA is taken as a part of the feature. In addition, the answer numeral is a numeral meaning that the game player inputs in the cell 62A in question, believing it to be a correct answer, and the note numeral is a numeral which is thought up through the thinking process until he or she reaches an answer numeral and noted. In FIG. 3 embodiment, in the cell 62AA on the touch panel 24, the note numerals of "4", "8", "7" and "6" are displayed by a smaller character. The answer numeral has not been input yet, but is displayed in a larger manner to such a degree so as to cover the almost entire of the cell 62AA while the note numeral is displayed in a smaller manner. When giving an answer to the cell 62A in question, the player inputs numerals which he thinks up as the note numeral. Nine (9) note numerals can be displayed at the maximum, and if one of the note numerals is adopted as an answer numeral, the applicable number is input by handwriting in a large manner as an answer numeral, and then, a settlement process described later is performed. When one of the note numerals is decided as an answer numeral in the settlement process, the answer numeral is entire-displayed or large-displayed.

In addition, arrows directed from four (4) sides of the enlarged cell 62AA in the four directions are illustrated in FIG. 3, and these arrows 63U, 63D, 63L and 63R function as a scroll button in order to select other cells adjacent to each of the directions. For example, when the scroll button 63U is touched, the cell adjacent to the current cell 62A in the upper direction is selected as an enlarged cell 62AA. For example, when the scroll button 63D is touched, the cell adjacent to the current cell 62A in the lower direction is selected as an enlarged cell 62AA, and when the scroll button 63L is touched, the cell adjacent to the current cell 62A in the left direction is selected as an enlarged cell 62AA. Additionally, when the scroll button 63R is touched, the cell adjacent to the current cell 62A in the right direction selected as an enlarged cell 62AA. At this time, if the answer numeral is large-displayed in the enlarged cell 62AA before scrolling, such a scrolling process is applied to the above-described settlement process.

As to the cell 62A in question, when an answer numeral is input to the cell for handwriting input 62AA by the player, the CPU core 34 (FIG. 2) examines or determines whether or not the answer numeral is correct by checking reference data set in advance in the game program described later against the answer numeral. However, such a game determination (determination whether the answer is correct or not) may be performed every time that the answer numeral is settled like the embodiment, and may also be performed all at once after answer numerals are settled with respect to all the empty cells. That is, the present invention is not exclusive to either of the method.

Here, referring to FIG. 4, a description will be made on the memory map of the RAM 42 shown in FIG. 2. In the RAM 42, a program storage area 42a and a data storage area 42b are formed. In the former, a game program 42a1, a handwritten input processing program 42a2, and a character recognition program 42a3 are stored in this embodiment. The game program 42a1 is a program for performing the Sudoku game as described above, and shown in detailed in a flowchart described later. The handwritten input processing program 42a2 is a program for fetching a track or locus of the stroke in the cell 62AA of the touch panel 24 handwritten by the player as described above. In addition, "Stroke" means a successive input locus from touching the touch panel 24 with the stick or the like 26 (touch-on) to releasing it (touch-off). The character recognition program 42a3 is a so-called "recognition engine", and a program to identify or recognize which character (numeral) is the character input by handwriting at that time on the basis of the data of the stroke as the above-described manner.

The data storage area 42b includes a handwritten data storing area 42b1, and in the handwritten data storing area 42b 1, the handwritten data of the first stroke, the handwritten data of the second stroke, the handwritten data of the third stroke, the handwritten data of the n-th stroke are temporarily stored. The handwritten data is typically a track or locus of each stroke (position data on the touch panel 24 fetched per unit of one or appropriate number of frames). As described later, the determination whether the player inputs by handwriting the above-described note numeral or the answer numeral is basically performed based on the small and large of the stroke. That is, for a small stroke, it is determined that a note numeral is input, and for a large stroke, it is determined that an answer numeral is input. In addition, as described above, for the answer numeral, this is large-displayed, and for the note numeral, this is small-displayed, but the display position of the note numeral to be small-displayed is decided in relation to the position of the handwritten input for the note numeral in the embodiment (specifically, on the basis of the position of the midpoint of the handwriting input region). Furthermore, the note numerals up to maximum of nine (9) can be handwritten in the embodiment, and therefore, unless the note numeral is overwritten, the position in which one note numeral is small-displayed is any one of the nine (9) regions in the cell 62AA.

With referring to the handwritten data for each stroke recorded in the handwritten data storing area 42b1, it is possible to know the size, large and small, of the input region as a reference to determine whether the input character is the note numeral or the answer numeral, the midpoint of the input region as a basis of the display position of the note numeral, etc. as well as the input locus of the stroke.

The data storage area 42b further includes a handwritten image storing area 42b2. The handwritten image storing area 42b2 is an area to temporarily store the locus data included in the handwritten data when recognition is made by the character recognition program 42a3.

The recognition processing result storing area 42b3 is an area to store the result of the recognition process performed by the character recognition program 42a3 on the basis of the locus data recorded in the handwritten image storing area 42b2. The recognition processing result includes one or more candidate numerals recognizable by the locus data, and scores (points) of each of the candidate numerals. Then, the candidate having a score value which is equal to or more than a predetermined value and the largest in number is recognized or identified as the numeral input at that time.

The data storage area 42b further includes a stroke counter 42b4, and the stroke counter 42b4 is an area to count the number of strokes when a handwritten input is performed. For numerals, "1", "2", "3", "6", "8" and "9" are one-stroke character (characters writable by one stroke) while "4" and "5" are a two-stroke character (characters being apt to be written by two strokes). However, "7" can be determined to be the one-stroke character and two stroke-character. Thus, in order to determine whether the input character is the one stroke-character or two-stroke character, the count value of the stroke counter 42b4 is utilized.

A display image storing area 42b5 and a character and image data for display storing area 42b6 are areas to store display data as a bit map. The display image storing area 42b5 stores a display image as a bitmap image when a character cannot be recognized by the character recognition engine 42a3 and in a case that the handwritten character is displayed as it is, for example.

The game screen/character image data storing area 42b6 stores a plurality of game screens 60 as bitmap data as shown in FIG. 3 each including a 9×9 grid with 3×3 subblocks, for example, and each having different arbitrary cells 62 in which numerals as a hint are imbedded depending on each question number. Each of the plurality of game screens is applied with the question number. The game screen/character image data storing area 42b6 further stores a character font as a bitmap data in a case that a resultant character recognized by the recognition engine 42a3 is large-displayed or small-displayed.

A small-display region data storing area 42b7 is an area to store data for deciding a display position or a display area in a case that the note numeral is small-displayed. Specifically, also stored is data indicative any one of nine (9) regions I-IX indicating in which region in the cell 62AA (FIG. 3) the note numeral is input by handwriting when inputting the note numeral by handwriting.

As described above, since the determination whether the player inputs by handwriting the notes numeral or the answer numeral is performed in association with the size of the stroke, a handwriting region size determining data storing area 42b8 stores reference data or standard data (threshold values L1 and L2, etc. in the Equation 4 described later) to determine the size of the stroke, that is, the size of the handwriting region.

Furthermore, a large-display determining data storing area 42b9 stores reference data or standard data to determine whether the recognition result of the numeral input by handwriting is to be large-displayed or small-displayed.

Finally, a flag area 42b10 is an area to store appropriate flags, such as a touch-on flag. The touch-on flag is a flag to store a touch-on state that a player's finger or the stick or the like 26 touches the touch panel 24.

As described above, in this embodiment, numerals to fill in the cells of the Sudoku game are input by handwriting, and in association with the size of the handwriting region (stroke), whether the numeral input by handwriting is the note numeral or the answer numeral is determined Hereafter, with reference to FIG. 5-FIG. 8, an outline of recognition of the numeral by such a handwritten input and the display of the recognition result are described.

FIG. 5 illustratively shows one example of a method of determining whether or not the numeral as a recognition result is large-displayed in the cell 62AA shown in FIG. 3. The cell 62AA is a square or a rectangle as shown in FIG. 5(A). Then, it is assumed that the coordinates of the starting point of the stroke, that is, the touch-on position is (xi1, yi1), and the coordinates of the endpoint of the stroke, that is, the touch-off position is (xi2, yi2). It is assumed that the locus data (position data per unit of time) of the stroke being successive from the starting point to the endpoint are (x1, y1), (x2, y2), . . . (xn, yn). Such locus data are stored in the handwritten data storing area 42b1 shown in FIG. 4 for each stroke. Furthermore, it is assumed that within the cell 62AA, the upper end and lower end in the vertical direction of the large-display region (illustrated by dotted lines in FIG. 5) by which it is determined whether or not to be large-displayed are YS1 and YS2, the left end and right end in the horizontal direction thereof are be XS1 and XS2. The large-display area data XS1, XS2, YS1, and YS2 are stored in the large-display determining data storing area 42b9 in FIG. 4 as a part of the large-display determining data. These data are set to the area 42b9 as a default value by any one of the game program 42a1 and the handwritten input processing program 42a2.

On the above-described assumption, the handwriting region (region to be formed of the handwritten input) can be represented by the equation 1 according to the handwritten data stored in the handwritten data storing area.

$$(xi1, yi1) - (xi2, yi2) \quad [\text{Equation 1}]$$

Then, the midpoint coordinates (xim, yim) of the handwriting region (the center of gravity of the rectangle circumscribing the handwriting input region) can be represented by the Equation 2 by use of the handwriting region data.

$$(xim, yim) = ((xi1+xi2)/2, (yi1+yi2)/2) \quad [\text{Equation 2}]$$

When the midpoint position of the handwriting region is within the large-display area, and the handwriting region is above a certain degree of size, that is, when the conditions of the Equation 3 and the Equation 4 are satisfied, the numeral as a handwritten character recognition result is large-displayed in the cell 62AA as shown in FIG. 5(B).

$$XS1 < xim < XS2 \text{ and } YS1 < yim < YS2 \quad [\text{Equation 3}]$$

$$|xi2\ xi1| > L1 \text{ or } |yi2| > yi1 > L2 \quad [\text{Equation 4}]$$

The L1 and L2 are threshold values.

Figure 4:
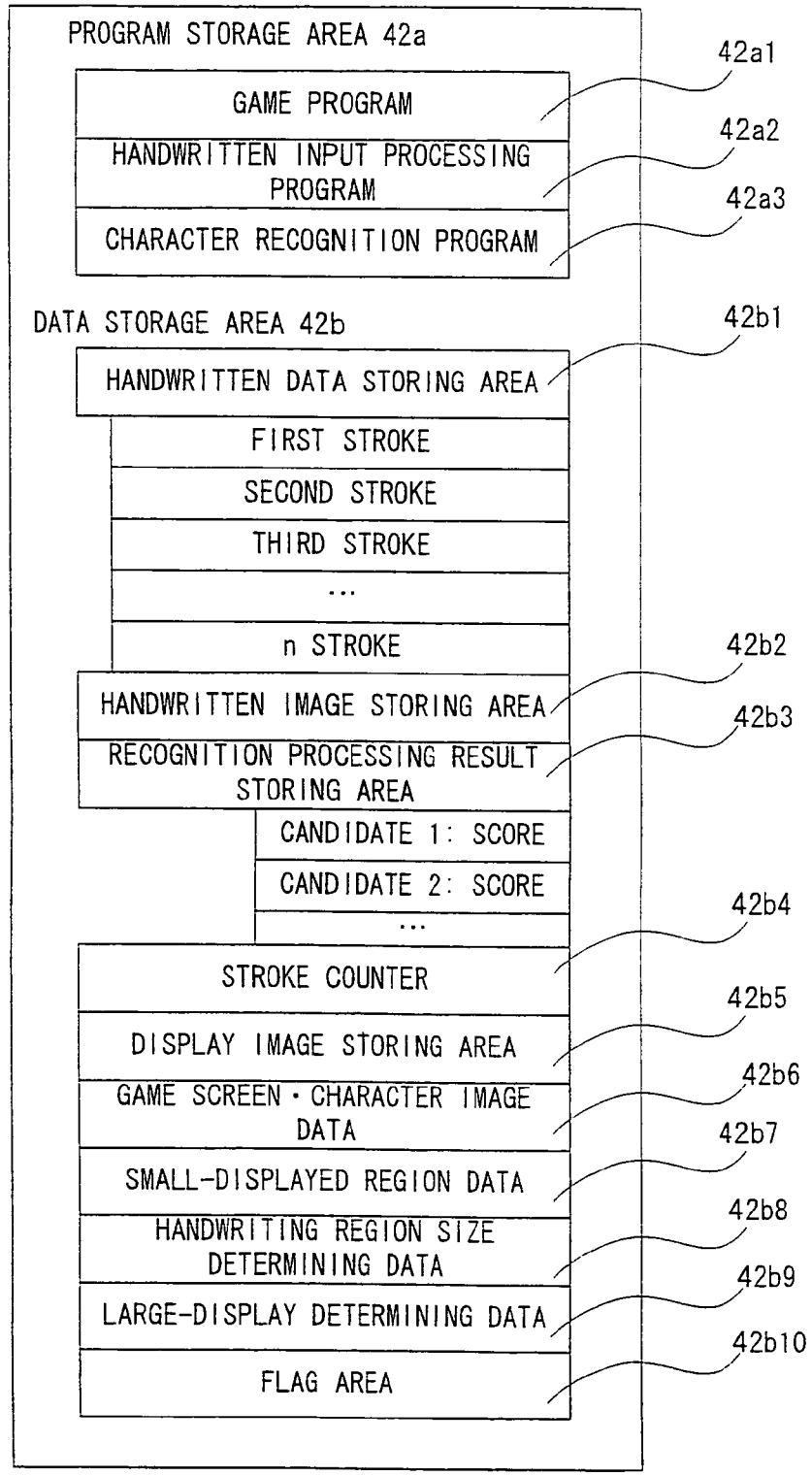
FIG. 4 is an illustrative view showing one example of a memory map of a RAM shown in FIG. 2.

In addition, the threshold values L1, L2 in the Equation 4 are stored as data for determining the size of the handwriting region in the handwriting region size determining data storing area 42b8 shown in FIG. 4.

Then, in FIG. 5 example, a result of determination for the handwritten character that is input such that the condition in the Equation 1 is satisfied in FIG. 5(A) is "2", and therefore, "2" is large-displayed in a whole area of the cell 62AA by a character font in FIG. 5(B).

FIG. 6 illustratively shows a case that a handwritten character is small-displayed when the recognition result of the handwritten character is a note numeral. When the handwritten character does not satisfy the large-display condition in the above-described Equation 1, the handwritten character at that time is determined to be a note numeral. The nine (9) regions I-IX to small-display the note numeral is shown in FIG. 6(A). In the illustrated example, the cell 62AA is partitioned into small-display regions I-IX of 3×3, and as to each of the regions I-IX, when the above-described midpoint coordinates (xim, yim) of the handwritten region is within the range (X1<xim<X2, Y3<yim<Y4), the region I is determined, similarly, when the midpoint coordinates (xim, yim) is within the range of (X1<xim<X2, Y2<yim<Y3), the region II is determined, and when the midpoint coordinates (xim, yim) is within the range of (X1<xim<X2, Y1<yim<Y2), the region III is determined. When the midpoint coordinates (xim, yim)

is within the range of (X2<xim<X3, Y3<yim<Y4), the region IV is determined, when the midpoint coordinates (xim, yim) is within the range of (X2<xim<X3, Y2<yim<Y3), the center region V is determined, and when the midpoint coordinates (xim, yim) is within the range of (X2<xim<X3, Y1<yim<Y2), the region VI is determined. When the midpoint coordinates (xim, yim) is within the range of (X3<xim<X4, Y3<yim<Y4), the region VII is determined, when the midpoint coordinates (xim, yim) is within the range of (X3<xim<X4, Y2<yim<Y3), the region VIII is determined, and when the midpoint coordinates (xim, yim) is within the range of (X3<xim<X4, Y1<yim<Y2), the region IX is determined.

Which region of the handwritten regions the midpoint coordinates of the handwritten region belongs to at that time is stored as the small-display region data in the small-display region data storing area 42b7 (FIG. 4).

Then, in FIG. 6 example, a recognition result of the handwritten character is input without satisfying the condition in the Equation 1 is "2", and the midpoint coordinates (xim, yim) at that time belongs to the area I in FIG. 6(A), and therefore, "2" is small-displayed by the character font in the area I within the cell 62AA in FIG. 6(B).

Figure 7:
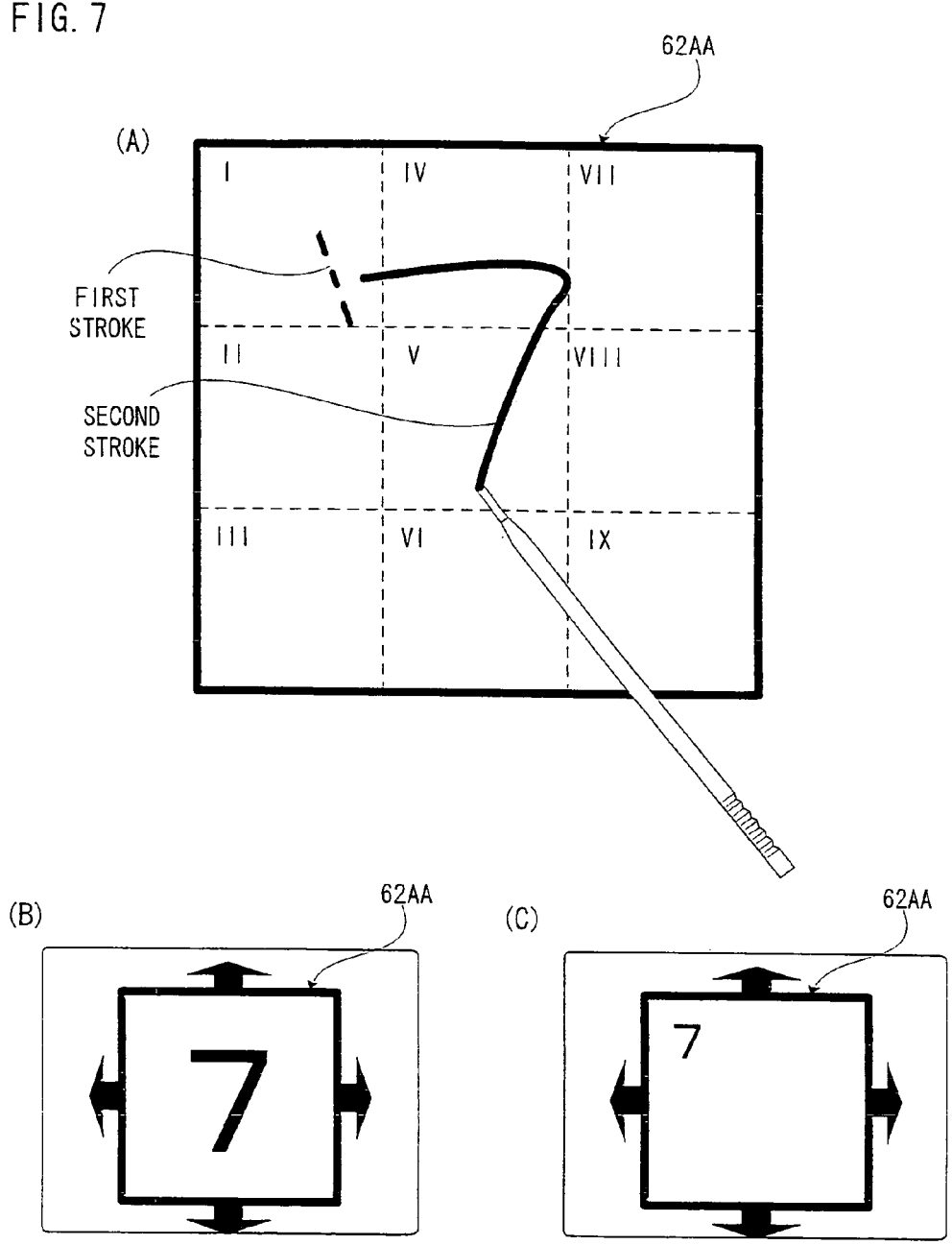
FIG. 7 is an illustrative view showing one example of a case that a handwritten input can be recognized when a history of a second stroke is added to a history of a first stroke.

Referring to FIG. 7, FIG. 7 is an illustrative view showing one example of a case that that a handwritten input can be recognized when a locus of a second stroke is added to a locus of a first stroke to make a character recognition for a handwritten input by two strokes. "7" may be written by one stroke, but not a few people writes it by two strokes (in the United States and Europe, some may add a point like "" to the vertical line of the "7"). Here, it is assumed that "7" is handwritten by a short vertical line of the first stroke (shown by the dotted line in FIG. 7(A)) and the horizontal and vertical lines of the second stroke.

In this embodiment, when a character recognition is performed on the locus of the first stroke along with the locus of the second stroke shown in FIG. 7(A), if a recognition rate (score) is equal to or more than the predetermined value, and the numeral is a numeral generally writable by two strokes such as "4", "5", and "7", whether the numeral recognized at that time is large-displayed (entire-display) or small-displayed is determined depending on the size of the second stroke handwritten input region.

That is, when the second stroke is above a certain degree of size, specifically, when the second stroke is larger than the size shown in the Equation 3 (|xi2 xi1|>L1 or |yi2 yi1|>L2), the recognized numeral ("7" in the shown example) is entire-displayed in the cell 62AA by the character font as shown in FIG. 7(B).

However, when the second stroke handwritten region is not so large, the recognized numeral ("7") is small-displayed in the region to which the first stroke belongs (the region I in the drawing) by the character font as shown in FIG. 7(C). A fact that the second stroke is not so large indicates that the player intends to input by handwriting a note numeral, and in this case, the numeral is displayed in the region to which the first stroke belongs.

Figure 8:
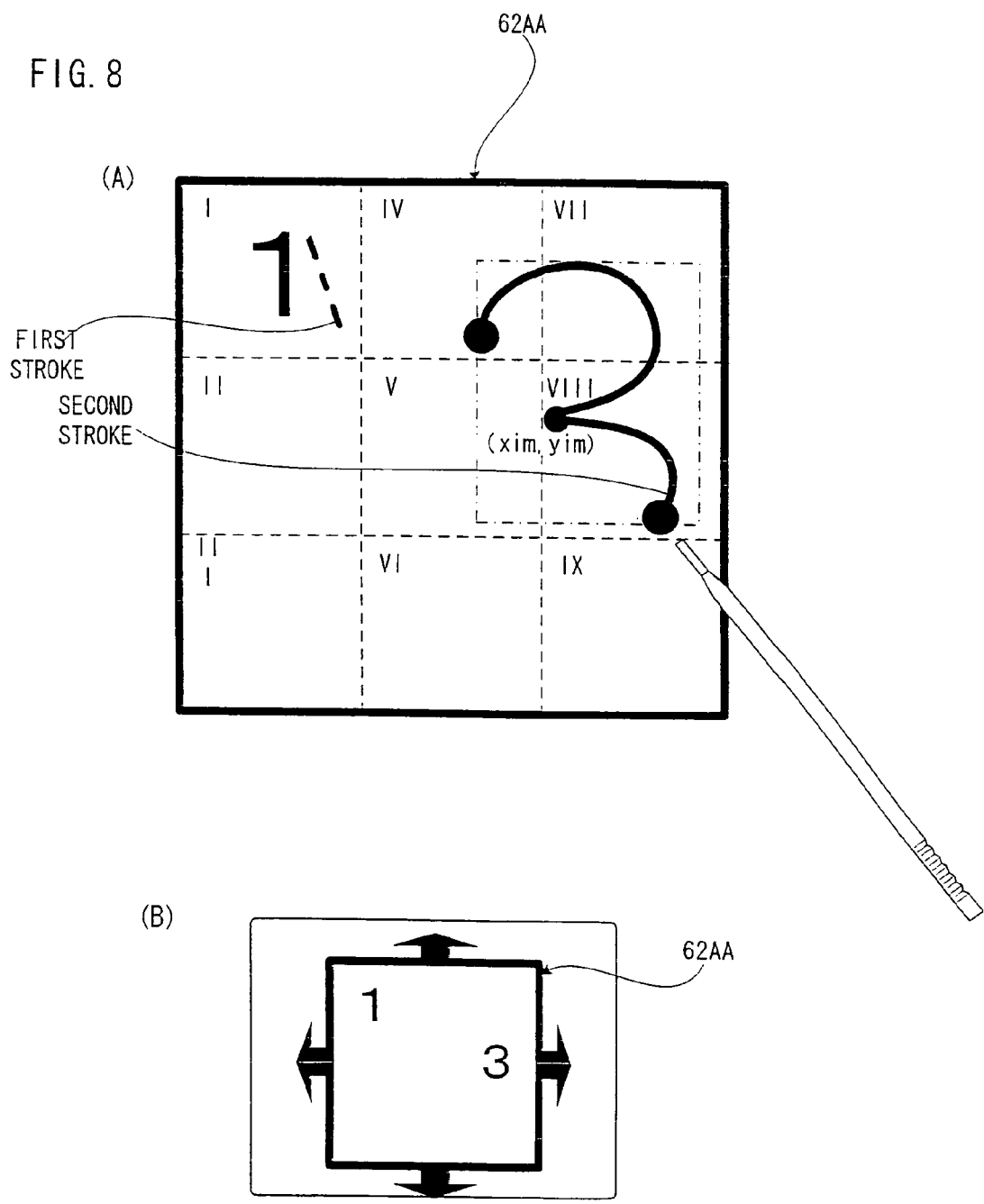
FIG. 8 is an illustrative view showing one example of a case that a handwriting input cannot be recognized even when a history of a second stroke is added to a history of a first stroke.

FIG. 8 shows an example case that only a score smaller than the recognition rate (score) based on only the first stroke is obtained when a character recognition is performed based on both of the locus of the first stroke and the locus of the second stroke. In the embodiment, in this case, the character recognition is made only by the locus of the second stroke. Accordingly, in this case, according to FIG. 5 or FIG. 6, the numeral capable of being recognized at that time is large-displayed or small-displayed.

In FIG. 8(A), the locus of the first stroke can be recognized as "1" with above the certain degree of recognition rate (score), but when the loci combining the first stroke and the second stroke is compared with the locus of only the second stroke, the score value becomes smaller than the score value "3" as to the second stroke, and thus, the recognition is made only by the second stroke to identify it as "3". At this time, the midpoint coordinates of the second stroke belongs to the region VIII, and therefore, the recognized numeral "3" is small-displayed in the region VIII by the character font.

As described above, according to this embodiment, depending on the size and position of the handwritten input region on the touch panel 24, it is possible to automatically determine whether or not the numeral input by handwriting at that time is the answer numeral to be large-displayed or the note numeral to be small-displayed. This makes it possible for the game player to naturally input according to intuitive human senses without discriminating the handwriting input of the answer numeral and the handwriting input of the note numeral. Taking into account that such the handwritten input processing and the character recognition, a description is made mainly on the operation of the CPU core 34 (FIG. 2) when the Sudoku puzzle game is performed in the embodiment according to the game program 42a1 (FIG. 4) with reference to the flowcharts in FIG. 9-FIG. 13.

Figure 9:
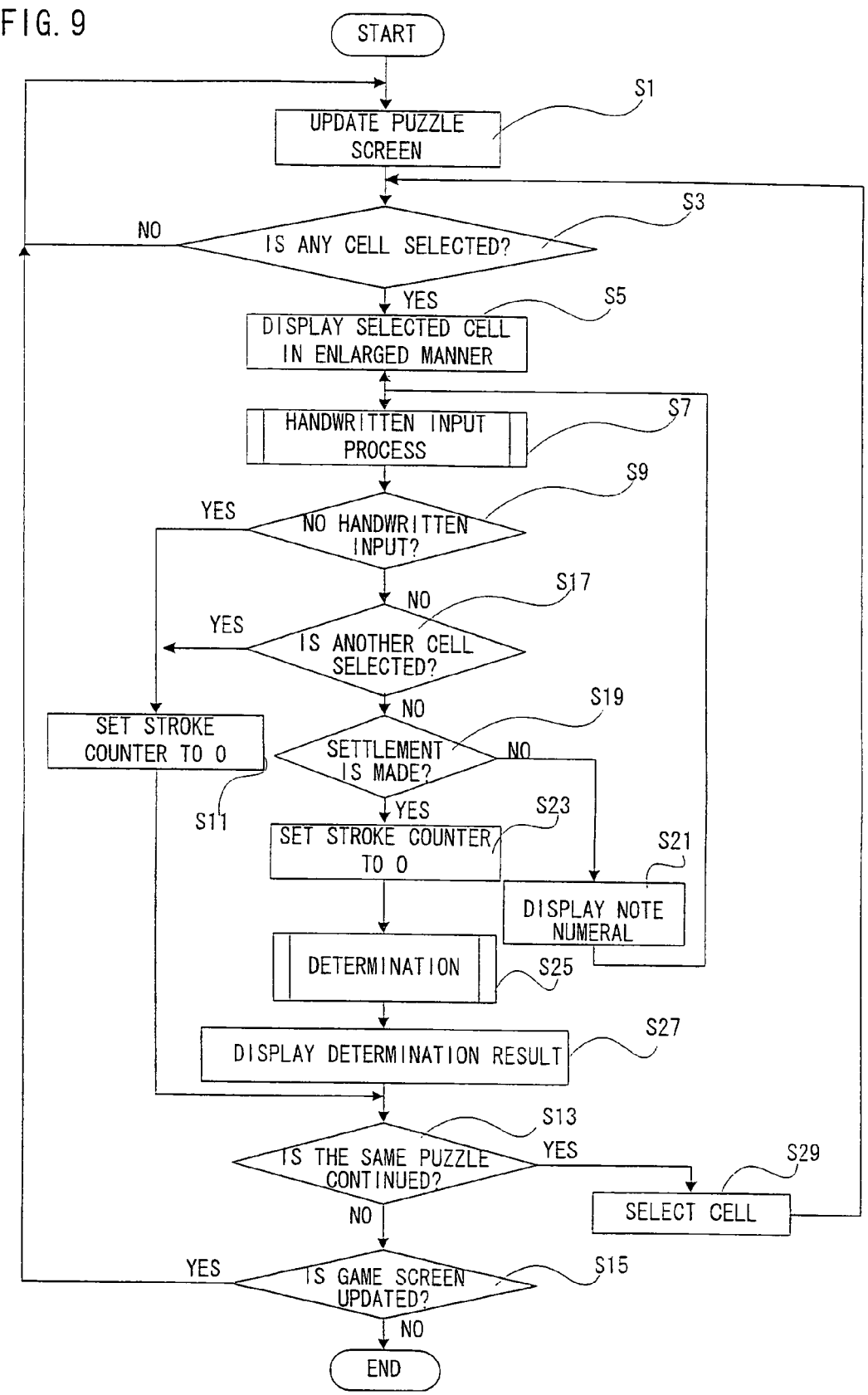
FIG. 9 is a flowchart showing an operation when "Sudoku" is played in the game apparatus of the embodiment shown in FIG. 1 and FIG. 2.

In a first step S1 in FIG. 9, the CPU core 34 reads a puzzle screen (game screen 60: FIG. 3) from the game/character image storing area 42b6 according to the game program, and displays it first on the second LCD 12. Then, in a next step S3, the CPU core 34 determines whether or not any empty cell in the game screen 60 is touched by a game player on the basis of the data from the touch panel 24, that is, the I/F circuit 48 (FIG. 2). If any of the empty cell is touched, it is determined that the cell is selected in the step S3, and the process proceeds to a step S5 while if "NO" is determined, it is waited until a cell is selected.

In the step S5, the CPU core 34 moves the game screen 60 previously displayed on the second LCD 14 to the first LCD 12 to display the selected empty cell in the enlarged manner on the second LCD 14. The state that the process so far is performed is the state in FIG. 3. That is, in the step S5, as shown in FIG. 3, the entire game screen 60 is displayed on the first LCD 12, and the enlarged cell 62AA in question is displayed on the second LCD 14.

Next, the game player inputs by handwriting a numeral on the touch panel 24 with the use of the stick or the like 26. At this time, the CPU core 34 fetches handwritten input data according to the handwritten input processing program 42a2. However, if the player does not input by handwriting a numeral after lapse of a constant time period, if "YES" is determined in a step S9.

If "YES" is determined in the step S9, the CPU 34 resets the stroke counter 42b4 (FIG. 4) to "0" in a step S11, and the CPU core 34 determines whether or not the player performs an operation for continuing the same puzzle in a step S13. If "YES" is determined, the CPU core 34 next updates the game screen in a step S15. At a fact that "NO" is determined in the step S13 and "NO" is also determined in the step S15 means that the game player ends the game, and the game will be ended at that time.

Any touch input is present in a step S7, and thus, "NO" is determined in the step S9, but if the operation is an operation to select another cell, it is determined that an answer to the cell selected in the step S3 is not given, and then, the process proceeds to the next step S11 through a step S17.

If the player inputs the numeral by handwriting within the constant time period of the step S5, the handwritten input processing in the step S7 is executed.

Here, a description on the handwritten input processing in the step S7 is made in detail with reference to FIG. 10-FIG. 13.

Figure 10:
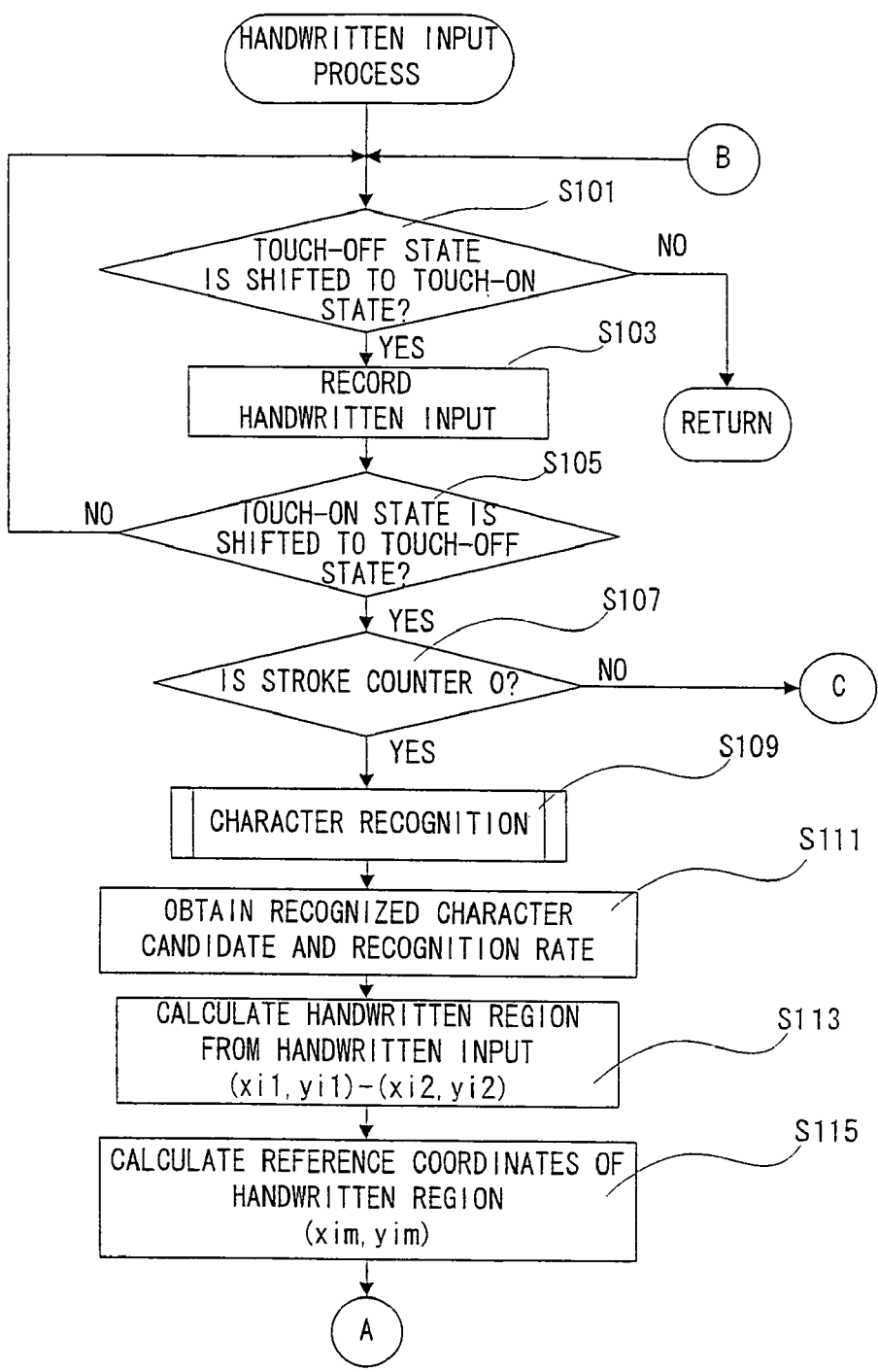
FIG. 10 is a flowchart showing an operation of a handwriting input process in the flowchart shown in FIG. 9.

In a first step S101 in FIG. 10, the CPU core 34 determines whether or not a touch-on state has come in response to the touch panel 24 being touched with the stick or the like 26 and the touch-on flag in the flag area 42b10 (FIG. 4) being turned on. If "NO" is determined, the process returns to the step S9 in FIG. 9. If "YES" is determined, in a next step S103, the data of the input locus from the touch panel 24 is stored as the first stroke data of the handwritten data storing area 42b1 (FIG. 4). The recording of the handwritten input data is continued until a touch-off is detected in a step S105. The handwritten input is for the first stroke, and therefore, the input locus data is, of course, recorded in the first stroke region in the area 42b1.

In a following step S107, the CPU core 34 determines whether or not the handwritten input described above is for the first stroke, that is, whether or not the stroke counter 42b4 is "0". As described above, the stroke at this time is the first stroke, and therefore, "YES" is determined in the step S107, and in a succeeding step S109, the CPU core 34 executes a character recognition process by the character recognition program 42a3.

Then, in a step S111, the CPU core 34 receives a character recognition result, that is, a recognized character candidate and a recognition rate of each candidate (score value). Accordingly, in the step S111, the result is recorded in the recognition result storing area 42b3.

In a succeeding step S113, the CPU core 34 calculates a handwritten region on the basis of the locus data of the first stroke temporarily stored in the handwritten data storing area 42b1 according to the aforementioned Equation 1. On one hand, in a step S115, the CPU core 34 calculates the midpoint coordinates, that is, the reference coordinates of the handwritten region calculated in the step S113 according to the aforementioned Equation 2.

Next, the CPU core 34 determines the midpoint coordinates, that is, the reference coordinates (xim, yim) is within the predetermined area, that is, within the large-display region (dotted lines in FIG. 5) on the touch panel 24 by calculating according to the Equation 3 in a step S117. If the midpoint coordinates is within the large-display area, in a succeeding step S119, the CPU core 34 determines whether or not the handwritten region is above the certain degree of size according to the Equation 4. That is, it is determined whether or not the length of the handwritten region in the horizontal direction is more than a threshold value L1, or whether or not the length of the handwritten region in the vertical direction is more than a threshold value L2.

That "YES" is determined in each of the both steps S117 and S119 means that the locus of the first stroke is handwritten in the large-display region above the certain degree of size. This means, for example, the answer numeral shown in FIG. 5 is handwritten. Accordingly, in this case, in a next step S121, it is determined whether or not the handwritten input is recognized on the basis of the recognized candidate and the score value fetched in the preceding step S111. If there is a candidate having the recognition rate, that is, the score value above the predetermined value is present, "YES" is determined in the step S121. If "YES" is determined in the step S121, the recognized numeral (the recognized candidate having the largest score value is identified as a recognized numeral) is large-displayed by the character font in the cell 62AA (FIG. 3) displayed on the second LCD 14 in an enlarged manner in a step S123.

In addition, after the step S123, the CPU core 34 increments the stroke counter 42b4 (FIG. 4) in a step S124. This is because that it is necessary to prepare for a case that "1" and "L", for example, are written to thereby recognize or identify "4".

When "NO" is determined in the step S121, it is determined that the handwritten input at this time is the first stroke of the numeral which is made up of two strokes, in a step S125, a handwritten image generated and stored in the handwritten image storing area 42b2 (FIG. 4) at a time that the handwritten input data of the first stroke was being recorded in the step S103 is displayed on the second LCD 14, and the stroke counter 42b4 is incremented by one (+1) in preparation for the handwritten input of the second stroke in the step S117. Then, the process returns to the step S101 (FIG. 10).

If "NO" is determined in either one or both of the steps S117 and S119, a note numeral as shown in FIG. 6 may be input, and therefore, in a next step S129, the CPU core 34 determines which regions I-IX shown in FIG. 6 the midpoint coordinates (xim, yim) of the handwritten input region at that time belongs to, and stores it in the small region data storing area 42b7 (FIG. 4).

Then, in a successive step S131, the CPU core 34 determines whether or not the small-displayed handwritten input can be recognized in the same manner as the step S121. If "YES" is determined, the handwritten character recognized at this time is the note numeral, and in a next step S133, the CPU core 34 small-displays the recognized character (numeral) in the region previously specified in the step S129 as shown in FIG. 6.

In addition, after the step S133, the CPU core 34 increments the stroke counter 42b4 (FIG. 4) in a step S134. This is because that it is necessary to prepare for a case that "1" and "L", for example, are written to thereby recognize or identify them as "4".

If "NO" is determined in the step S131, it is determined the handwritten input at this time is a first stroke of the numeral being made of up two strokes, and a handwritten image generated and stored in the handwritten image storing area 42b2 (FIG. 4) at a time when the handwriting input data of the first stroke was being recorded in the step S103 is displayed on the second LCD 14 in a step S135, and the stroke counter 42b4 is incremented by one (+1) in preparation for the handwriting input of the second stroke in a step S137. Then, the process returns to the step S101 (FIG. 10).

Thus, if the handwritten input of the first stroke can be recognized as an answer numeral or a note numeral, the numeral is large-displayed or small-displayed as shown in FIG. 5 or FIG. 6, but if it is determined that the handwritten input at that time is not the first stroke in the step S107 in FIG. 10, the process proceeds to a step S139 shown in FIG. 12. Hereafter, a "current stroke" essentially means a stroke of the second stroke, and a "previous stroke" means that a stroke of the first stroke.

In the step S139, a handwritten region of the second stroke is calculated according to the handwritten data of the current stroke stored as second stroke data in the handwritten data storing area 42b1 in the step S103 according to the Equation 1 similarly to the step S113. Then, in a step S141, the midpoint coordinates (reference coordinates: xim, yim) of the handwritten region of the second stroke is calculated.

In a succeeding step S143, the CPU core 34 performs a character recognition process according to the character recognition program 42a3 on both the locus data of the first stroke and the locus data of the second stroke stored in the handwritten data storing area 42b1. Thereafter, the CPU core 34 receives a character recognition result, that is, the recognized character candidate and a recognition rate (score value) for each candidate in a step S145. Accordingly, in the step S145, the result is recorded in the recognition result storing area 42b3.

In a next step S147, the CPU core 34 determines whether or not the recognition rate is equal to or more than the predetermined value and the recognized candidate is "4", "5" or "7" (numerals basically made up of two strokes). At this time, the determination of "YES" means the current stroke is valid as the second stroke, and the determination of "NO" means that the current stroke had better not be determined as the second stroke.

If the current stroke is valid as the second stroke, "YES" is determined in the step S147, and therefore, the process proceeds to a step S149. In the step S149, it is determined whether or not the current stroke, that is, the handwritten region of the second stroke is above a certain degree of size (Equation 4).

A fact that "YES" is determined in the step S149 means that the locus of the second stroke is handwritten above a certain degree of size, and that the answer numeral made up of two strokes is handwritten like a FIG. 7(B) example. Accordingly, in this case, in a next step S151, it is determined whether or not the handwritten input is recognized on the basis of the recognized candidate and the score value fetched in the preceding step S145. If a candidate having the recognition rate, that is, the score value being equal to or more than the predetermined value is present, "YES" is determined in the step S151. If "YES" is determined in the step S151, the recognized numeral is large-displayed in the cell 62AA which is displayed in an enlarged manner on the second LCD 14 in a step S153. Then, after the completion of the step S153, due to the same reason as the step S124, the CPU core 34 increments the stroke counter 42b4 (FIG. 4) in a step S154.

If "NO" is determined in the step S151, it is determined that the handwritten input (current stroke) at this time is a first stroke of the numeral made up of two strokes, in a step S155, the handwritten image of the current stroke stored in the handwritten image storing area 42b2 (FIG. 4) is displayed on the second LCD 14, and in a step S157, the stroke counter 42b4 is set to "1" as a preparation to the successive handwritten inputs, and then, the process returns to the step S101 (FIG. 10).

In the preceding step S149, when "NO" is determined, the note numeral made up of two strokes like FIG. 8(C), for example, may be input, the CPU core 34 determines whether or not the character input by handwriting with two strokes can be recognized in a next step S161. If "YES" is determined, the handwritten character recognized at this time is the note numeral, and the CPU core 34 small-displays the recognized character (numeral) in the region of the first stroke previously specified in the step S129 as shown in FIG. 8(C) in a next step S163. Here, the reason why the note character is small-displayed not in the second stroke region but in the first stroke region is that the position of the first stroke is prioritized to thereby make the processing simple, and to respect for player's intention (intend to write the note numeral in the position of the first stroke).

Then, due to the same reason as the step S134, after completion of the step S163, the CPU core 34 increments the stroke counter 42b4 in a step S164.

In addition, when "NO" is determined in the step S161, it is determined that the handwritten input (current stroke) at this time is a first stroke of the numeral made up of two strokes, in a step S165, the handwritten image of the current stroke stored in the handwritten image storing area 42b2 (FIG. 4) is displayed on the second LCD 14, and in a step S167, the stroke counter 42b4 is set to "1" in preparation for successive handwritten inputs. Then, the process returns to the step S101 (FIG. 10).

So far, referring to FIG. 10 and FIG. 11, a description was made on the large-display of the answer numeral and the small-display of the note numeral when a handwritten input by one stroke is made. In addition, referring to FIG. 12, a description was also made on the large-display of the answer numeral and small-display of the note numeral when the numeral is made up of two strokes of the handwritten input. However, if "NO" is determined in the step S147 in FIG. 12, that is, when a character recognition is performed on the locus data of the first stroke and the locus data of the second stroke together, if the recognition rate (score value) above the predetermined value is not obtained, or if the recognized candidate having a high score value is not a numeral which is essentially made up of two strokes ("4", "5", "7"), there is a possibility that another note numeral is overwritten, or the handwriting is performed in the position separately from the previous stroke. Thus, in this case, in the step S169 in FIG. 13, the character recognition is performed by only the handwritten data of the current stroke in this embodiment.

That is, in the step S169, a character recognition process is executed only by the input locus of the current stroke. Then, in a step S171, the CPU core 34 determines whether or not the recognition rate only by the current stroke is smaller than the recognition rate (step S145) including the previous stroke. If "YES" is determined in the step S171, the process returns to the step S117 in FIG. 11. Therefore, in this case, examples of FIG. 5 or FIG. 6 may occur.

However, if "YES" is determined in the step S171, the CPU core 34 determines whether or not the current stroke and the previous stroke are in the same region in a succeeding step S173. Then, if "YES" in the step S173, the recognition result recognized in the step S143 is displayed in the same position and size as the previous stroke in a step S177. That is, the recognition result is small-displayed in the region of the previous stroke as the note numeral. The note numeral in this case was not made up of two strokes, or was made up of two strokes, but did not have the recognition rate (score) above the predetermined value.

That "NO" is determined in the step S173 means that the current stroke and the previous stroke are performed in the different region, and in this case, in a step S175, it is determined whether or not the current stroke is above a certain degree of size (Equation 4). If "YES" in the step S175, the numeral recognized at this time (which is not the numeral basically made up of two strokes ("4", "5", "7") is large-displayed in the cell 62AA in a step S179.

Thus, FIG. 13 shows a small-display and a large-display when there was an input with two strokes, but the recognized numeral was not the numeral basically made up of two strokes ("4", "5", "7"). Then, after completion of the step S177 or the S179, the process returns to the step S101.

If "NO" is determined in the step S171, or if "NO" is determined in the step S175, the current stroke is regarded as a first stroke in both cases, and then, the process returns to the step S117 in FIG. 11.

Thus, the process in the step S7 shown in FIG. 9 is executed, and according to FIG. 10-FIG. 13, depending on whether the numeral input by handwriting at that time is the answer numeral or the note numeral, the handwritten numeral is large-displayed or small-displayed on the second LCD 14.

Then, in a step S19 in FIG. 9, the CPU core 34 determines whether or not a settlement process is executed by the game player. The settlement process is a process for settling as an answer numeral the note numeral small-displayed in the cell 62AA, and includes various methods. For example, as described above, one method is that any one of the scroll arrows 63U, 63D, 63L and 63R shown in FIG. 3 is touched in a state the answer numeral is large-displayed in the enlarged cell 62AA to thereby select an adjacent cell. Then, in the step S19, it is determined whether or not such a settlement process is executed.

In addition, when the answer numeral is directly handwritten without writing the note numeral, by touching any one of the scroll arrows 63U, 63D, 63L and 63R shown in FIG. 3 in a state the answer numeral is large-displayed in the cell 62AA and thereby selecting another empty cell, the answer numeral at that time can be settled as an ultimate answer numeral.

Unless the settlement process is executed in the step S19, the note numeral is a note numeral as it is, and is small-displayed in an appropriate region in a step S21. Thereafter, the process returns to the step S7 to execute the handwritten input and the character recognition.

When "YES" is determined in the step S19, the CPU core 34 resets (set to "0") the stroke counter 42b4 (FIG. 4) in preparation for the following handwritten input in a next step S23. Accordingly, the reset ("0") of the stroke counter 42b4 may be a criterion for the presence or absence of the settlement process.

Then, in a step S25, the CPU 34 determines whether or not the answer numeral on which the settlement process is performed at that time is correct with reference to the answer set in correspondence with the question in the game program 42a1. Next, as a result of the determination, whether the answer numeral is correct or wrong is displayed on the first LCD 12 and/or the second LCD 14, for example so as to be confirmed by the game player.

Then, the process proceeds to the step S13 to determine whether or not the same puzzle is continued, and if "YES" is determined, a next empty cell is selected in the next S29, and the process returns to the step S3.

Furthermore, the playable game in this invention includes any puzzles filling in the cells with numerals, characters, or symbols such as sum cross, a crossword puzzle, a skeleton puzzle, a Samunamupure (Sum Number Place) (Killer Sudoku), a Union Number Place, etc. as well as games filling up the cells with numerals such as the Sudoku puzzle. Accordingly, in this invention, characters, symbols as well as numerals like the embodiments can be input. However, in the claims and other portions, in order to avoid complexity, "character" as a representative example is used and therefore, it is to be understood that the term "character" is a concept including numerals and symbols.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus for playing a game, comprising:
an input device configured to input an answer character input to the game apparatus;
a display which displays an answer character when the answer character is input by said input device;
a processor which performs a game determination on the basis of said answer character;
said display displays a result of the game determination by said processor;
said input device is configured to input a note character input to the game apparatus;
said display displays the note character input by said input device; and
said processor settling said note character as said answer character.

2. A game apparatus according to claim 1, wherein said input device receives a plurality of note characters, and said display simultaneously displays said plurality of note characters.

3. A game apparatus according to claim 1 wherein said input device includes:
a handwriting input device having a defined handwriting region,
a locus storing device which stores a locus of a handwritten input on the defined handwriting region,
a character recognition system which recognizes the handwritten character according to said locus, and
a size determination system for determining whether a size of the handwritten character is above a predetermined size based on said locus, wherein the input device receives the handwritten input as said answer character in response to an affirmative determination of said size determination system, and input device receives said handwritten input as said note character in response to a negative determination of said size determination system.

4. A game apparatus according to claim 3, wherein said locus storing system stores a locus for each stroke, and said locus storing system further comprises a stroke counter for counting a number of strokes, wherein said character recognition system recognizes a handwritten character based on both the loci of a previous stroke and the loci of a current stroke when a count value of said stroke counter is not a predetermined value.

5. A game apparatus according to claim 4, wherein said display displays said note character in a handwritten position of the previous stroke when said size determination system makes a negative determination as to the handwritten character of the current stroke.

6. A game apparatus according to claim 4 wherein said character recognition system recognizes the handwritten character based on the current stroke when the count value of said stroke counter is at said predetermined value.

7. A non-transitory storage medium storing a handwriting input program for a computer apparatus including a display, a non-transitory storage device, and a handwriting input device, said program causes a computer of the computer apparatus to perform:
a handwriting inputting step which stores a locus of a handwritten input made with the handwriting input device in said storage device;
a locus region specifying step which specifies a locus region corresponding to the stored locus, wherein the locus region is within a handwritten input region stored in said storage device;
a character recognizing step which performs a character recognition process on the locus of the handwritten input stored in said storage device; and
a recognition result displaying step which displays a result of said character recognition process, wherein said result is displayed in a size corresponding to the size of the locus region and in a position corresponding to said locus region on said display.

8. The non-transitory storage medium according to claim 7 wherein said recognition result displaying step further includes a character display size determining step for determining a display size of said recognition result in correspondence to the size of the locus region specified by said locus region specifying step, and a character display position determining step for determining a display position of said character recognition result in correspondence to the position of the locus region specified by said locus region specifying step.

9. The non-transitory storage medium according to claim 8, wherein said character display size determining step determines said display size depending on whether or not a central point of the locus region specified by said locus region specifying step is included in a predetermined region of said handwritten input region stored in said storage means in advance, and whether or not the locus region has a predetermined size.

10. The non-transitory storage medium according to claim 8, wherein said display position determining step determines that the central point of said locus region corresponds to one of said plurality of display positions of said recognition result stored in said storage device, and displays the recognition result in said corresponding display position.

11. A game apparatus for playing a game including at least one processor, a display, a non-transitory memory storing data and an executable program, and a data input device, wherein the executable program causes the processor to:
receive answer data inputted using the data input device and determine the received answer data to be an answer character based on the answer data as received;
display on the display the answer character contemporaneously with the determination of the received answer data being the answer character;
make a game determination based on the answer character;
display a result of the game determination;
receive note data inputted using the data input device and determine the received note data to be a note character based on the note data as received;
display the note character contemporaneously with the determination of the received note data to be the note character;
settle the note character as an answer character based on an input designating the displayed note character to be an answer character, and display the answer character determined from settling the note character.

12. The game apparatus of claim 11 wherein the reception of the note data is repeated and a plurality of note characters are displayed each corresponding to one of the received note data.

13. The game apparatus according to claim 11 wherein the data input device includes a hand held input device, wherein the answer data and answer data are input as handwritten characters using the hand held input device, and the executable program causes the processor to:
store a locus of a handwritten character inputted by the hand held input device;
recognize the handwritten character based on the locus;
determine the recognized handwritten character to be the answer character if a size of the recognized handwritten character is greater than a predetermined size;
the determination of the received answer day include determining the recognized handwritten character to be the answer character if a size of the recognized handwritten character is greater than a predetermined size, and
the determination of the received note data includes determining the recognized handwritten character to be the note character if a size of the recognized handwritten character is smaller than the predetermined size.

14. The game apparatus of claim 13 wherein the storing a locus of a handwritten character includes:
storing a locus for each stroke made with the hand held input device to form the handwritten character, counting the strokes, and the recognition of the handwritten character is based on the loci of a previous stroke and a current stroke, when the current count is not a predetermined count value.

15. The game apparatus according to claim 14 the recognition of the handwritten character to be the note character includes displaying a prior stroke.

16. The game apparatus according to claim 14 wherein the recognition of the handwritten character is based on the current stroke when the count is at the predetermined value.

17. A non-transitory computer readable storage medium storing a handwriting input program causing a computer of the handwriting input device to:
receive answer data from a data input device and determine the received answer data to be an answer character contemporaneously with when the answer data is received;
display on a display the answer character contemporaneously with the determination of the received answer data being an answer character;
make a game determination based on the answer character;
display a result of the game determination;
receive note data from the data input device and determine the received note data to be a note character;
display the note character contemporaneously with the determination of the received note data to be a note character;
settle the note character as an answer character based on an input designating the displayed note character as an answer character, and
display the answer character determined from settling the note character.

18. The non-transitory computer readable storage medium of claim 17 wherein the reception of the note data is repeated, and a plurality of note characters are displayed each corresponding the received note data.

19. The non-transitory computer readable storage medium of claim 17 wherein the data input device and the executable program causes the computer to:
store a locus of a handwritten character inputted by the hand held input device;
recognize the handwritten character based on the locus;
determine the recognized handwritten character to be the answer character if a size of the recognized handwritten character is greater than a predetermined size;
the determination of the received answer day include determining the recognized handwritten character to be the answer character if a size of the recognized handwritten character is greater than a predetermined size, and
the determination of the received note data includes determining the recognized handwritten character to be the note character if a size of the recognized handwritten character is smaller than the predetermined size.

20. The game apparatus of claim 19 wherein the storing a locus of a handwritten character includes:
storing a locus for each stroke made with the hand held input device to form the handwritten character,
counting the strokes, and
the recognition of the handwritten character is based on the loci of a previous stroke and a current stroke, when the current count is not a predetermined count value.

21. The game apparatus according to claim 20 the recognition of the handwritten character to be the note character includes displaying a prior stroke.

22. The game apparatus according to claim 19 wherein the recognition of the handwritten character is based on the current stroke when the count is at the predetermined value.

23. A method to detect and process answers and notes inputted as user input data to a game apparatus having a processor and a display, the method comprising:
- receiving user input data and determining the received user input data to be an answer character based on a characteristic of the user input data;
- displaying on the display the answer character contemporaneously with the determination of the received user data is the answer character;
- making a game determination based on the answer character;
- displaying a result of the game determination;
- determining the received user input data to be a note character based on the characteristic of the user input data;
- displaying the note character contemporaneously with the determination that the user input data is the note character;
- settling the note character as an answer character based on a user input made after the note character is displayed, and
- displaying the answer character determined from settling the note character.

24. The method of claim 23 wherein the determination that the user input data is to be the answer character includes determining if an input stroke of the user input data is greater than a predetermined stroke size.

25. The method of claim 23 wherein the storing a locus of a handwritten character includes:
- storing a locus for each stroke made with the hand held input device to form the handwritten character,
- counting the strokes, and
- the recognition of the handwritten character is based on the loci of a previous stroke and a current stroke, when the current count is not a predetermined count value.

26. The game apparatus according to claim 25 the recognition of the handwritten character to be the note character includes displaying a prior stroke.

27. The game apparatus according to claim 25 wherein the recognition of the handwritten character is based on the current stroke when the count is at the predetermined value.

28. A game system for playing a game comprising:
- an input device configured to receive an input character;
- a processor which classifies the input character to be an answer character or a note character based on size of the input, wherein the processor performs a game determination if the input character is classified as said answer character;
- a display which displays the answer character and the note character, and
- said processor classifying the note character as the answer character in response to an input to settle on the note character made to the input device.

29. An game apparatus comprising:
- a display;
- a non-transitory storage device storing an executable program;
- a handwriting input device, and
- a computer processor, when executing the program, causes the apparatus to perform:
  - a handwriting inputting step which stores a locus of a handwritten input made with the handwriting input device in said storage device;
  - a locus region specifying step which specifies a locus region corresponding to the stored locus, wherein the locus region is within a handwritten input region stored in said storage device;
  - a character recognizing step which performs a character recognition process on the locus of the handwritten input stored in said storage device; and
  - a recognition result displaying step which displays a result of said character recognition process, wherein said result is displayed in a size corresponding to the size of the locus region and in a position corresponding to said locus region on said display.

30. A method using a computer apparatus including a display, a non-transitory storage device storing a program, and a handwriting input device, the computer, when executing the program, performs:
- a handwriting inputting step which stores a locus of a handwritten input made with the handwriting input device in said storage device;
- a locus region specifying step which specifies a locus region corresponding to the stored locus, wherein the locus region is within a handwritten input region stored in said storage device;
- a character recognizing step which performs a character recognition process on the locus of the handwritten input stored in said storage device; and
- a recognition result displaying step which displays a result of said character recognition process, wherein said result is displayed in a size corresponding to the size of the locus region and in a position corresponding to said locus region on said display.

31. A system comprising:
- a display;
- a non-transitory storage device storing an executable program;
- a handwriting input device, and
- a computer processor, when executing the program, causes the system to perform:
  - a handwriting inputting step which stores a locus of a handwritten input made with the handwriting input device in said storage device;
  - a locus region specifying step which specifies a locus region corresponding to the stored locus, wherein the locus region is within a handwritten input region stored in said storage device;
  - a character recognizing step which performs a character recognition process on the locus of the handwritten input stored in said storage device; and
  - a recognition result displaying step which displays a result of said character recognition process, wherein said result is displayed in a size corresponding to the size of the locus region and in a position corresponding to said locus region on said display.

* * * * *